United States Patent [19]
Strack et al.

[11] Patent Number: 5,883,515
[45] Date of Patent: Mar. 16, 1999

[54] METHOD OF DETERMINING FORMATION RESISTIVITY UTILIZING COMBINED MEASUREMENTS OF INDUCTIVE AND GALVANIC LOGGING INSTRUMENTS

[75] Inventors: Kurt M. Strack; Leonty A. Tabarovsky, both of Houston, Tex.

[73] Assignee: Western Atlas International, Inc., Houston, Tex.

[21] Appl. No.: 887,557

[22] Filed: Jul. 3, 1997

Related U.S. Application Data

[63] Continuation of Ser. No. 562,638, Nov. 27, 1995, abandoned, which is a continuation of Ser. No. 390,230, Jan. 17, 1995, abandoned, which is a continuation of Ser. No. 95,394, Jul. 21, 1993, abandoned.

[51] Int. Cl.[6] .............................. G01V 3/18; G01V 3/24; G01V 3/28; G01V 3/38
[52] U.S. Cl. .................... 324/339; 324/366; 324/373; 702/7
[58] Field of Search ..................... 324/323, 338–341, 324/366, 373–375; 364/422; 702/7

[56] References Cited

U.S. PATENT DOCUMENTS

| | | | |
|---|---|---|---|
| 3,075,142 | 1/1963 | Albright et al. | 324/375 |
| 3,181,057 | 4/1965 | Bravenec | 324/339 X |
| 3,397,356 | 8/1968 | Dumanoir | 324/339 X |
| 3,453,530 | 7/1969 | Attali | 324/339 X |
| 3,493,849 | 2/1970 | Doll | 324/339 X |
| 3,982,176 | 9/1976 | Meador | 324/339 X |
| 3,993,944 | 11/1976 | Meador et al. | 324/339 X |
| 4,484,278 | 11/1984 | Edmundson | 324/339 X |

*Primary Examiner*—Gerard Strecker
*Attorney, Agent, or Firm*—Darryl M. Springs

[57] ABSTRACT

A method of determining selected parameters of an earth formation surrounding a borehole by first, obtaining at least one induction logging measurement of the selected parameters in a first predetermined volume of the formation surrounding the borehole having known first radial and vertical dimensions, then obtaining at least one galvanic logging measurement of the identical selected parameters in a second predetermined volume of the formation surrounding the borehole having known second radial and vertical dimensions that overlap the first radial and vertical dimensions of the first predetermined volume, whereby the overlapping volumes form a representative common volume of the formation, and then combining the induction and galvanic logging measurements using an inversion technique to obtain a measurement of the selected parameters of the earth formation surrounding the borehole in the representative common volume of the formation.

10 Claims, 21 Drawing Sheets

A type model
Rm = 1
Rxo = 10
Rt = 100
BHD = 8
Di = 60

METHOD OF DETERMINING FORMATION RESISTIVITY UTILIZING COMBINED MEASUREMENTS OF INDUCTIVE AND GALVANIC LOGGING INSTRUMENTS

This is a continuation of application Ser. No. 08/562,638 filed on Nov. 27, 1995 (now abandoned) which is a continuation of application Ser. No. 08/390,230 filed on Jan. 17, 1995 (now abandoned) which is a continuation of application Ser. No. 08/095,394 filed on Jul. 21, 1993 (now abandoned).

FIELD OF THE INVENTION

This invention relates to methods of determining earth formation parameters and more particularly relates to a method of measuring formation resistivity surrounding a borehole utilizing combined measurements of inductive and galvanic logging instruments.

BACKGROUND OF THE INVENTION

Modern conventional electrical resistivity measurements are grouped into two classes, those injecting electrical currents into the formation by means of electrodes (galvanic logging devices, including lateral, spherically focused, and normal devices) and those using coils (induction logging devices) for creating eddy currents in the formation. The galvanic logging methods are really just developments of the original electrode instrument methods invented by the Schlumberger brothers in the 1920's. (L. Allaud and M. Martin, "Schlumberger, the History of a Technique," Wiley, New York, 1977). The induction logging methods and devices were created by Henri-Georges Doll in the 1940's. (H. G. Doll, Pet. Trans. AIME, 186, 148, 1947).

For the induction logging device the signal measured from a particular formation zone is inversely related to the resistivities in the formation around the borehole and to the resistivities within the borehole. For the galvanic logging devices the signal measured is non-linearly related to the resistivities and the resistivity contrasts of the borehole and the formations surrounding the borehole. At the borehole/formation/invaded zone boundaries, electrical charges arise for galvanic logging devices, while for induction logging devices, the effect is due to the induced current in the borehole/formation/invaded zone media. In the field of electromagnetic surveying, the different situations are usually described as different modes, the transverse electric (TE) mode in the case of the induction devices, and the galvanic or transverse magnetic (TM) mode for the galvanic (electrode) devices.

In the field of surface electromagnetic surveying of the earth, the joint measurement and interpretation of inductive and galvanic (TE and TM) techniques has been investigated in recent years. (T. Eadie, "Detection of Hydrocarbon Accumulations by Surface Electrical Methods—A Feasibility Study," Master's Thesis, University of Toronto, 1980). Based on Eadie's work and the initial application of a numerical interpretation technique referred to as "joint inversion" (K. Vozoff and D. L. B. Jupp, "Joint Inversion of Geophysical Data," Geophys. J.R. astr. Soc., v. 42, pp. 977–991, 1975; D. L. B. Jupp and K. Vozoff, "Resolving Anisotrophy in Layered media by Joint Inversion," Geophys. Pros.v. 25, pp. 460–470, 1977; and A. P. Raiche, D. L. B. Jupp, H. Rutters and K. Vozoff, "The Joint Use of Coincident Loop Transient Electromagnetic and Schlumberger Sounding to Resolve Layered Structures," Geophysics, v. 50, n. 10, pp. 1618–1627, 1985) led to the application of the combined modes (inductive and galvanic) for surface geophysical prospecting (K. -M. Strack, T. Hanstein, K. LeBrocq, D. C. Moss, K. Vozoff and P. A. Wolfgram, "Case Histories of LOTEM Surveys in Hydrocarbon Prospective Areas," First Break, v. 7, n. 12, pp. 467–476, 1989; K. -M. Strack, "Exploration With Deep Transient Electromagnetics," Elsevier, 1992, 373 pp.). However, for borehole applications the combination of the two modes (inductive and galvanic) to characterize the same volume of formation has not been developed. Recently, a paper has indicated that the inversion of induction tool responses alone has become available as a wellsite product as an improved interpretation method. (A. Q. Howard, "A New Invasion Model for Resistivity Log Interpretation," The Log Analyst, pp. 97–110, March–April 1992). Historically, induction and galvanic logging measurements investigating the same part of the formation are usually used in different borehole environments (mud conductivity) (Ellis, "Well Logging for Earth Scientists," Elsevier, (1987)) and for different relative formation resistivities (D. E. Johnson and K. E. Pile, "Well Logging For the Nontechnical Person," pp. 68–70, PennWell, 1988). Based on these considerations, either the induction logging or galvanic logging device is chosen for the borehole/formation resistivity conditions. Rarely are both logging devices (induction and galvanic) which investigate the same or similar volumes of formation run together in the borehole because of the excessive tool string length required and the increased cost. Although sometimes induction and galvanic devices are run in the same borehole, usually in separate runs, their measurements are not generally used to produce a combined interpreted response because either one of the logs produced by the two devices is deemed to exhibit the most applicable response characteristics to each particular section of the borehole and the formation.

BRIEF SUMMARY OF THE INVENTION

The method utilizes the combined measurements from both induction and galvanic logging instruments to obtain an improved definition of the electrical parameters of the formation surrounding a borehole.

The measurement data sets can be derived by using borehole logging devices giving induction and galvanic logging type responses which could have the following nature:

two or more separate tools used in either separate logging runs or as a combined tool string.

one combined tool measuring the inductive and galvanic response of the medium in parallel (simultaneously or separated by a short interval).

The combination can be performed by (i) one mandrel, (ii) two or more mandrels on one tool string, or (iii) separate tools run separately in the borehole even from different tool families as long as they characterize the induction and galvanic response of the medium.

The same mathematical model for both types of data sets is used in iterative optimization techniques which yield one optimized model consistent with both data sets for a given situation. The uncertainty in the definition of the model output parameters is improved through the combined usage of the two (or more) different data sets, and thus the precision and accuracy of the resulting formation resistivity value is improved (which is the key indicator of the interpretation quality.)

The optimization can be done in several ways including using iterative numerical techniques, or graphical techniques including correction charts, or even direct imaging techniques. The convergence to the final model is data and model parameters driven. The reliability of the improvement can be evaluated by using error bounds or confidence levels or sensitivities to the model parameters.

BRIEF DESCRIPTION OF THE DRAWINGS

In order that the manner in which the above-recited principles and features of the invention are attained can be understood in detail, a more particular description of the invention may be had by reference to specific embodiments thereof which are illustrated in the accompanying drawings, which drawings form a part of this specification.

In the drawings.

DETAILED DESCRIPTION OF THE PREFERRED EMBODIMENTS

Figure 1:
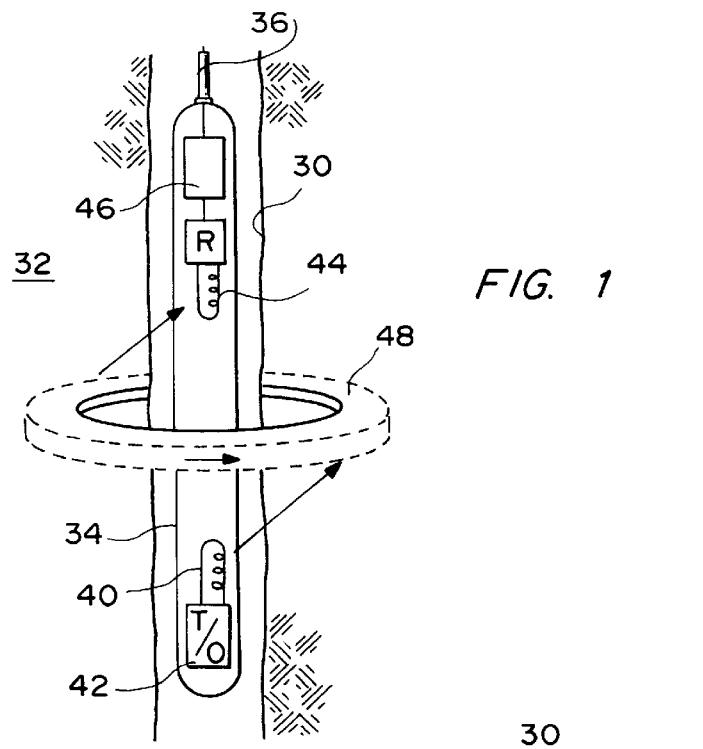
FIG. 1 is a simplified schematic drawing depicting a two-coil induction logging instrument including a diagrammatic presentation of the measurement technique of the induced electromagnetic field introduced into a formation.
Figure 2:
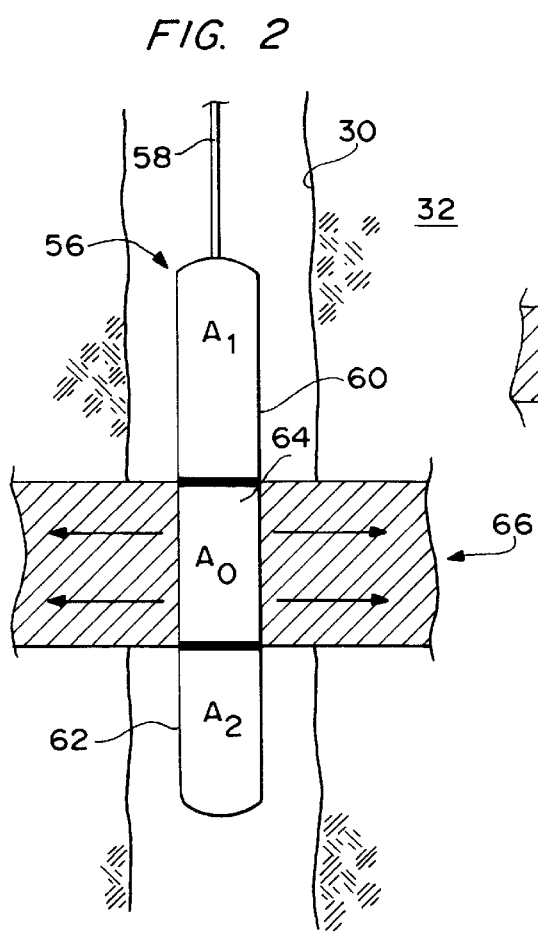
FIG. 2 is a simplified schematic drawing of a typical three-electrode lateral logging instrument including a diagrammatic presentation of the measurement technique of the electrical current introduced into a formation.
Figure 3:
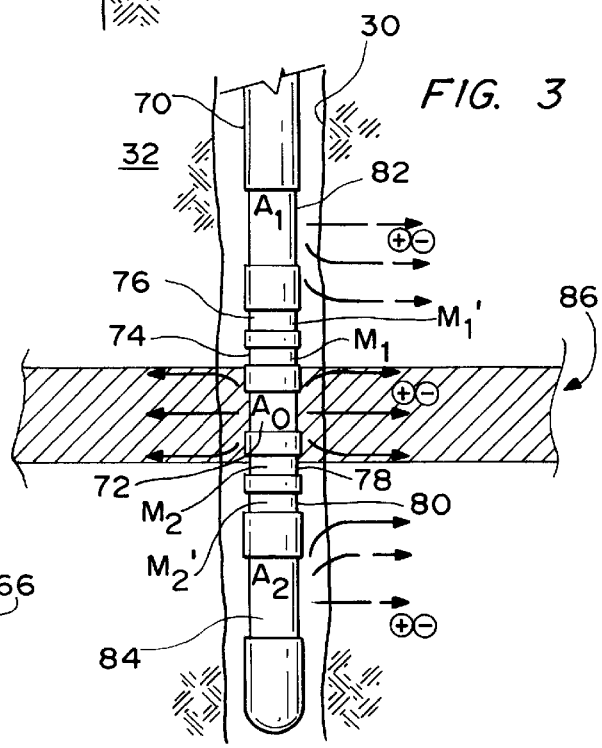
FIG. 3 is a simplified schematic drawing of a typical seven-electrode dual lateral logging instrument including a diagrammatic presentation of the measurement technique of the electrical current introduced into a formation.

Referring now to FIGS. 1—3, a brief description of the construction and operation of typical simplified induction and galvanic electrical resistivity logging instruments will be given. In FIG. 1, a borehole 30 is shown penetrating an earth formation 32 and in which is suspended an elongated induction logging instrument 34 by means of a wireline cable 36 communicating with the earth's surface (not shown). The logging tool 34 is raised and lowered by means of the cable 36 using conventional winch-type hoist trucks/skids (not shown), and command and data signals are transmitted to and from the tool to the surface through the cable. Spaced longitudinally in the tool housing 34 is a transmitter coil 40 interconnected to a transmitter oscillator 42 for generating a transmitter signal of a desired frequency and a receiver coil 44 interconnected to a receiver circuit 46. The transmitter coil 40 is energized by the transmitter oscillator 42 which sets up a magnetic field around the tool and extending into the formation. The constantly changing magnetic field causes currents to flow through the formation concentric to the axis of the tool 34. The currents, called ground loops, are shown diagrammatically as a ring-shaped section 48 of the formation 32 and are proportional to the conductivity of the formation. The ground loops currents at 48 alternate at the same frequency as the magnetic field and the transmitter current flowing through the transmitter coil 40. The ground loop currents 48 also set up secondary magnetic fields of their own, which interact with the receiver coil 44 to cause an electrical current to flow in the receiver coil 44. The amount of the current flowing in the receiver coil 44 is related to the ground loop 48 currents and therefore to the conductivity of the formation. The currents in the receiver coil 44 are detected by the receiver circuit 46 and transmitted to the surface for processing and recording (not shown) as either a conductivity measurement C or a resistivity measurement R, where R=1/C.

FIG. 2 shows a simple three-electrode "focused" electrical galvanic resistivity instrument 56 of the type known as a lateral logging device disposed in a borehole 30 penetrating an earth formation 32 and suspended therein by a wireline cable 58. The logging tool 56 is raised and lowered by means of the cable 58 by conventional means as previously described (not shown), and command and data signals are transmitted to and from the tool to the surface through the cable 58. The tool 56 includes an upper "guard" or "focusing" electrode 60 (A1), a lower "guard" or "focusing" electrode 62 (A2) and a "center" or "measuring" electrode 64 (A0). A constant current is emitted from the center or measuring electrode 64 (A0). The electrical potential of the pair of guard or focusing electrodes 60 (A1) and 62 (A2) are maintained equal in order that the current emitted from electrode 64 (A0) is forced out "laterally" into the formation and is "focused" in the section shown by the shaded area 66.

Another more complex "focused" electrical galvanic resistivity or lateral logging instrument is shown in FIG. 3. A borehole 30 is shown penetrating an earth formation 32 in which is suspended a seven-electrode lateral logging instrument 70 by means of a wireline cable (not shown) that operates in the same general manner as that described in FIG. 2. The survey-current electrode 72 (A0) is disposed in the center of the longitudinal array of electrodes, with a pair of measure electrodes 74 (M1) and 76 (M1') being disposed above the center electrode 72 (A0), and a pair of measure electrodes 78 (M2) and 80 (M2') being disposed below the center electrode 72 (A0). An upper focusing or guard electrode 82 (A1) is disposed above the upper measuring electrode 76 (M1'), while a lower focusing or guard electrode 84 (A2) is disposed below the lower measuring electrode 80 (M2'). The pair of upper and lower measure electrodes 74 (M1) and 78 (M2) are interconnected and short-circuited, as are electrode pairs 76 (M1') and 80 (M2') and electrode pairs 82 (A1) and 84 (A2). The guard electrodes 82 (A1) and 84 (A2) inject an auxiliary or "bucking" current into the formation 32, and the survey electrode 72 (A0) emits a "survey" current of the same polarity as the guard electrodes 82 (A1) and 84 (A2). A control signal representing the potential difference between the measure electrode pairs 74-78 (M1-M2) and 76-80 (M1'-M2') is processed to control the current delivered to the survey electrode 72 (A0). The system is self-nulling in that the bucking currents produced by the focusing electrodes 82 (A1)-84 (A2) are continuously adjusted in order to maintain the difference in the voltage differential across the measure electrode pairs 74-78 and 76-80 equal to zero [V(74-78)−V(76-80)=0]. This causes a lateral "focusing" effect in the formation surrounding the tool where the current from the survey electrode 72 (A0) is forced laterally outwardly to deeply penetrate the formation 32 as shown diagrammatically at 86. The potential measurement can be made at any one of the measure electrodes 74, 76, 78 or 80 with respect to a remote electrode spaced a great distance from the current field surrounding the tool, typically at the earth surface (not shown). The survey current flowing from electrode 72 (A0) is measured, and knowing the measured potential then permits calculation of a resistivity measurement R.

Figure 4:
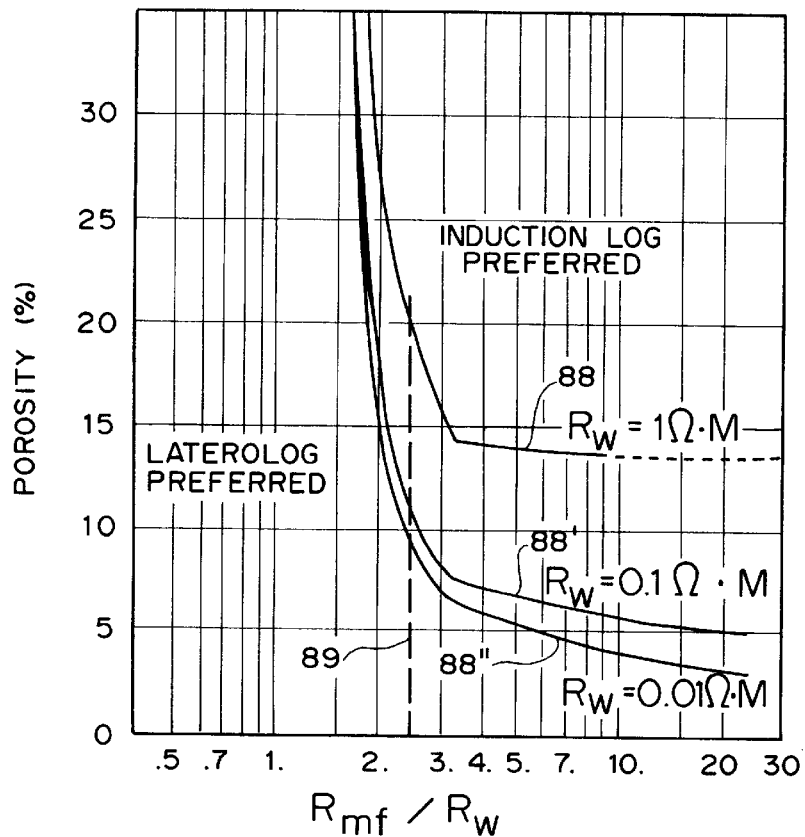
FIG. 4 is a diagram illustrating the typical environmental and formation conditions for currently selecting the use of a lateral or induction instrument when logging.

In current field practice, the induction and galvanic (lateral) logging measurements are taken separately in different borehole environments (mud conductivity) and predicted formation connate water resistivity ratios with the predicted resistivity of the mud filtrate in the formation. Generally, when highly conductive muds are used (salt water-based mud) the lateral logging instruments are preferred since the mud conductivity will provide direct current flow into the formation. On the other hand, the induction logging instrument was designed to be used in oil-based or low conductive water muds or in air-filled boreholes. FIG. 4 is a standard diagram showing the environmental and formation conditions usually considered for determining whether to select an induction logging instrument or a lateral logging instrument when logging a specific well. For instance, the resistivity of the formation water $R_w$ would be estimated using, for example, information from a nearby well. The resistivity of the mud filtrate $R_{mf}$ will then be estimated, which can also be done from information from a nearby well if the mud system will be the same, or by measurement of a sample if one is available. Then the porosity of the formation is estimated, which can be based on prior known information of the porosity obtained from a nearby well or from other logs that measure porosity.

Using the estimated data for $R_w$ and $R_{mf}$, a calculation of the ratio $R_{mf}/R_w$ is made. By referring to a chart or diagram similar to the one shown in FIG. 4, it is possible to determine the type of instrument most suited for the particular well. If the $R_{mf}/R_w$ ratio is 2.5 to 7.5, formation porosity is 15–25% and $R_w$ is equal to greater than 1 ohm-m, then the locus of those points will fall above the curve 88 ($R_w$=1 ohm-m) and to the right of the vertical dividing line 89, and thus the induction log is preferred. Similarly, if the $R_{mf}/R_w$ ratio is greater than 2.5, formation porosity is 5–10% and $R_w$ is equal to or greater than 0.01 ohm-m but less than 0.1 ohm-m, or equal to or greater than 0.1 ohm-m but less than 1 ohm-m, the locus of the data points will also fall above curves 88' and 88" and to the right of line 89, again indicating that an induction log is preferred. However, if the $R_{mf}/R_w$ ratio is below 2.5, and particularly if it is below 1.5, the locus of the data points will be to the left of line 89, and below all curves 88, 88' and 88", and then the lateral log is preferred. Although both instruments may be run in some wells, they are rarely interpreted together because either one of the logs is currently deemed to exhibit the most applicable response characteristics for each particular formation of interest in the borehole and the formation depending on the characteristics referred to above.

However, the method contemplated herein utilizes the combined responses from induction (electromagnetic) and lateral (galvanic) logging instruments to obtain improved definition of the electrical parameters of the formation around the borehole. The physical principle behind this method can be explained by first looking at the two individual principles of resistivity investigation of earth formations, namely "inductive" coupling to the formation and measurement of magnetic fields created in the formation, and "galvanic" direct electrical coupling to the formation and the measuring of electrical fields created thereby. The inductive approach generates induction currents in the formation which predominantly flow in conductive formation strata. This means that inductive measuring techniques are mainly sensitive to conductive strata in formations and relatively insensitive to more resistive strata. On the other hand, the galvanic techniques (lateral logging) generate electrical currents in the formation strata which in turn generate electrical charges at the layer boundaries of the formation strata. If the formation strata medium between two boundaries causing current flow is conductive, it will act to short circuit between the resistive layers. Thus the lateral logging techniques tend to be more sensitive to resistive strata because the conductive layers of the strata (which have been short circuited) do not significantly contribute to measuring the formation resistance. This above described measurement phenomena also explains why inductive and lateral logging techniques have been commonly applied separately to different resistivity (conductivity) formation environments.

The combination measurement method herein disclosed is based on the technique of combining the physical principles of inductive and galvanic measurement of resistivity (conductivity) either in one tool or separate tools. The key to the method is the combination of the different physical principles of inductive and galvanic measurement in the interpretation of the logging data for forcing theoretical responses (including both inductive and galvanic logging responses) of a single model of the formation to match real data which will improve the accuracy of determining the formation resistivity (conductivity).

Such measurements can be derived by using borehole logging devices that provide both induction logging and lateral logging types of responses as follows:

1. two or more separate tools (galvanic and induction) could be used in either separate logging runs or as a combined tool string; or
2. one combined tool measuring the inductive and galvanic response of the medium in parallel (simultaneously or separated by a short interval in the tool string); or
3. separate tools run separately even from different tool families as long as the responses characterize the induction and galvanic responses of the formation.

The combination of the responses (measurements) uses the same mathematical model for both types of response data sets and the same iterative optimization technique(s) which yield one optimized formation model which is consistent with both data sets for a given borehole/formation situation. The uncertainty in the model parameters is improved through the combination of using two (or more) different data sets based on the galvanic and induction responses. The combination may be accomplished by using any one of several well known techniques, such as iterative numerical methods, geographical techniques, or even direct imaging techniques. The key determinant for the selection of the method is the stability and speed of convergence to the final formation model. In addition, the reliability of the improvements can be evaluated by using error boundary or confidence levels or sensitivities to the model parameters.

Figure 5:
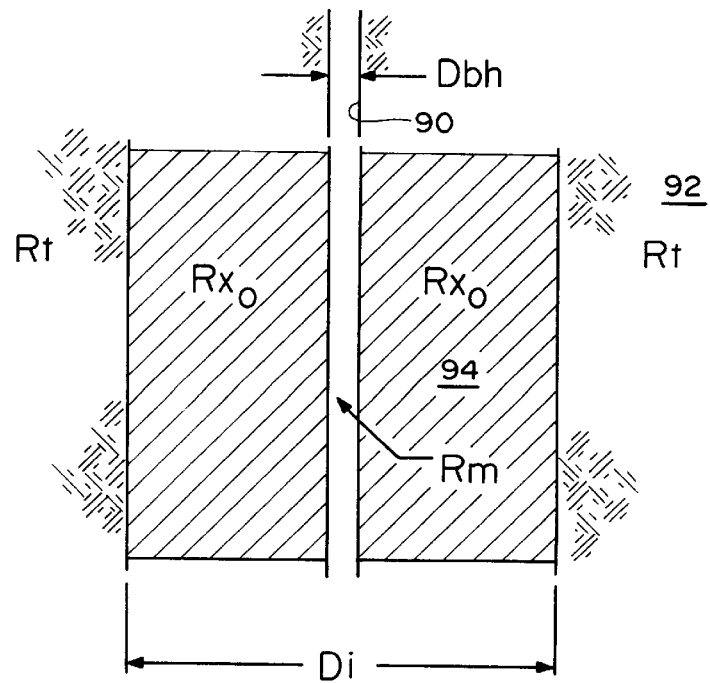
FIG. 5 is a stylized schematic diagram of an assumed earth model formation penetrated by a borehole and showing various formation medium related parameters.

To illustrate the preferred embodiment of the method, an example model formation will be assumed as shown in FIG. 5. A borehole 90 of diameter $D_{bh}$ is shown penetrating a formation of interest 92. The "invaded zone" of the formation invaded by the drilling mud fluid is shown at 94, which, in this example, has a step profile of diameter $D_i$. The resistivity of the drilling mud itself in the borehole 90 is shown as $R_m$, the resistivity of the invaded zone as $R_{xo}$ and the resistivity of the formation as $R_t$. For this example, the borehole diameter $D_{bh}$ was assumed to be 8 inches and the diameter of the invaded zone ($D_i$) is 60 inches. All possible cases of simple borehole resistivity models can be divided into four (4) basic classes of models of resistivity profile:

1. A-type: in which the resistivity increases from $R_m$, through $R_{xo}$ and to $R_t$;
2. Q-type: in which the resistivity decreases from $R_m$, through $R_{xo}$ and to $R_t$;
3. K-type: in which the resistivity of the interbedded invaded zone $R_{xo}$ is higher than $R_m$ and $R_t$; and
4. H-type: in which the resistivity of the interbedded invaded zone $R_{xo}$ is lower than $R_m$ and $R_t$.

The four classes of resistivity profile described above can be summarized in the following example:

|        | $R_m$  | $R_{xo}$ | $R_t$ |
|--------|--------|----------|-------|
| A-type | 1 <    | 10 <     | 100   |
| Q-type | 10 >   | 1 >      | 0.1   |
| K-type | 1 <    | 10 >     | 1     |
| H-type | 10 >   | 1 <      | 100   |

Evaluation of all of the above classes in the model would cover to first order all possible situations occurring in nature. Using the above established earth model parameters and the four classes of resistivity models, predicted responses can be calculated for the current effects in the formation due to each of the induction and lateral logging types of instruments using Maxwell's equations.

Figure 12:
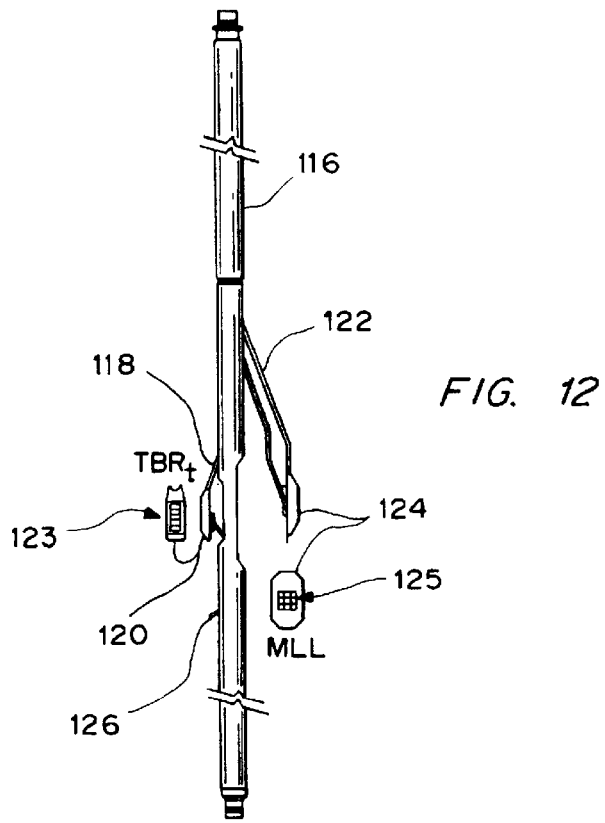
FIG. 12 is a schematic drawing of a selected combination logging tool including both a selected high vertical resolution lateral logging instrument for measuring thin-bed resistivity (TBRT) and a micro-laterolog (MLL) instrument.

The next step is to select several known induction and lateral logging tools that can be used in various combinations to obtain induction and lateral logging responses for each of the four classes of the assumed earth model formations. In the example situation herein under explanation, the following types of induction and lateral logging instruments of Atlas Wireline Services Division of Western Atlas International, Inc. were selected to determine their respective responses to the model formation:

1. Dual Phase Induction Logging (DPIL) Instrument (Series 1507), including in combination a Shallow Focused Lateral (SFL) Logging Instrument;

2. Dual Laterolog (DLL) Logging Instrument (Series 1229);
3. Lateral Logging Instrument having a high vertical resolution and deep lateral penetration known as a Thin-Bed Resistivity (TBRT) Logging Instrument (Series 1227); and
4. Micro Laterolog (MLL) Logging Instrument (Series 1233). (The MLL may be run in combination with the TBRT as one tool (the Series 1227) as illustrated in FIG. 12.)

A basic description of the operation and response of each of the above-described instruments will follow in connection with FIGS. 1–14.

Figure 6:
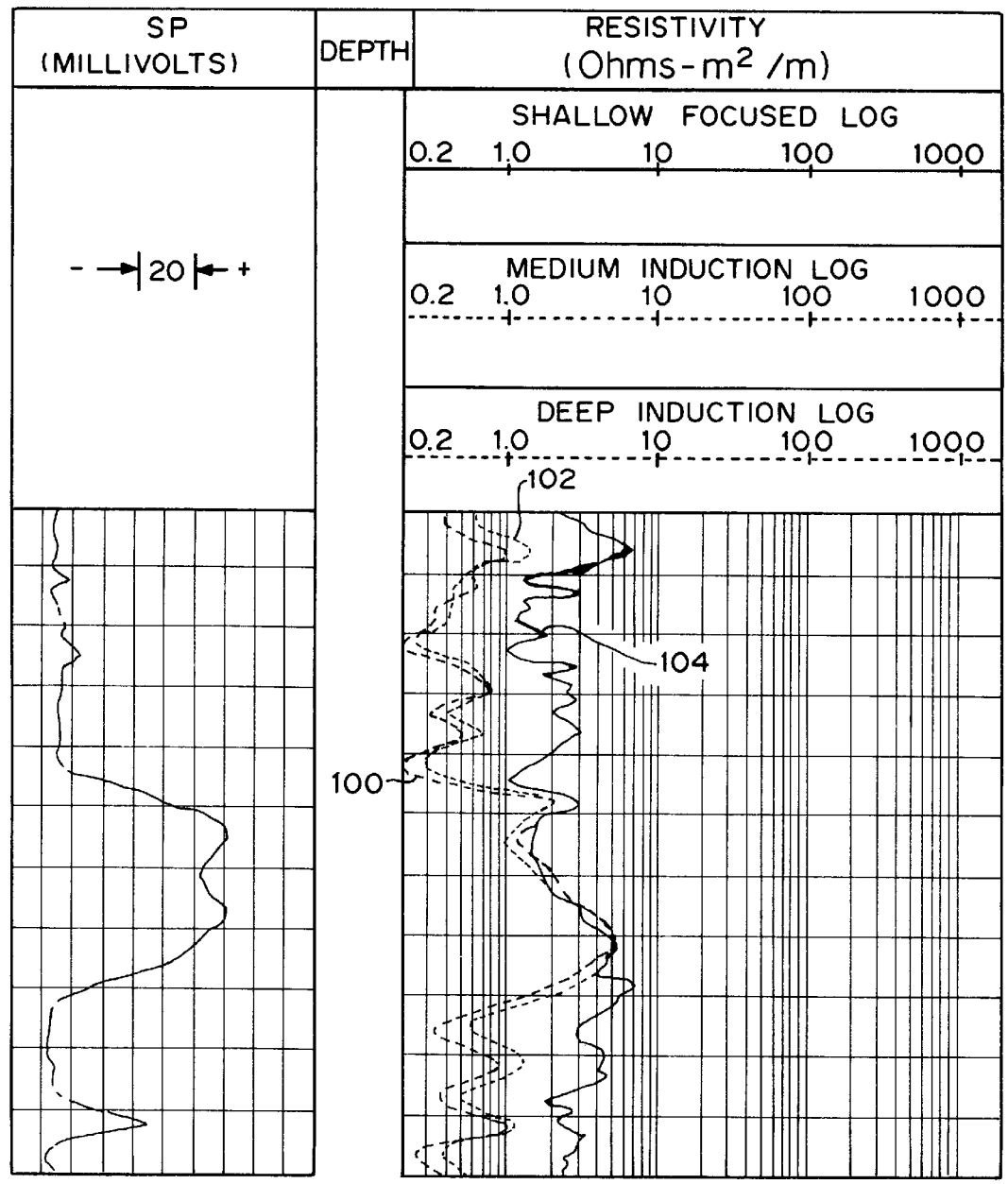
FIG. 6 is an example of a log made using a combination of a selected dual phase induction logging (DPIL) instrument and a selected shallow focused laterolog (SFL) instrument showing the DPIL deep and medium responses and the SFL shallow response.
Figure 7:
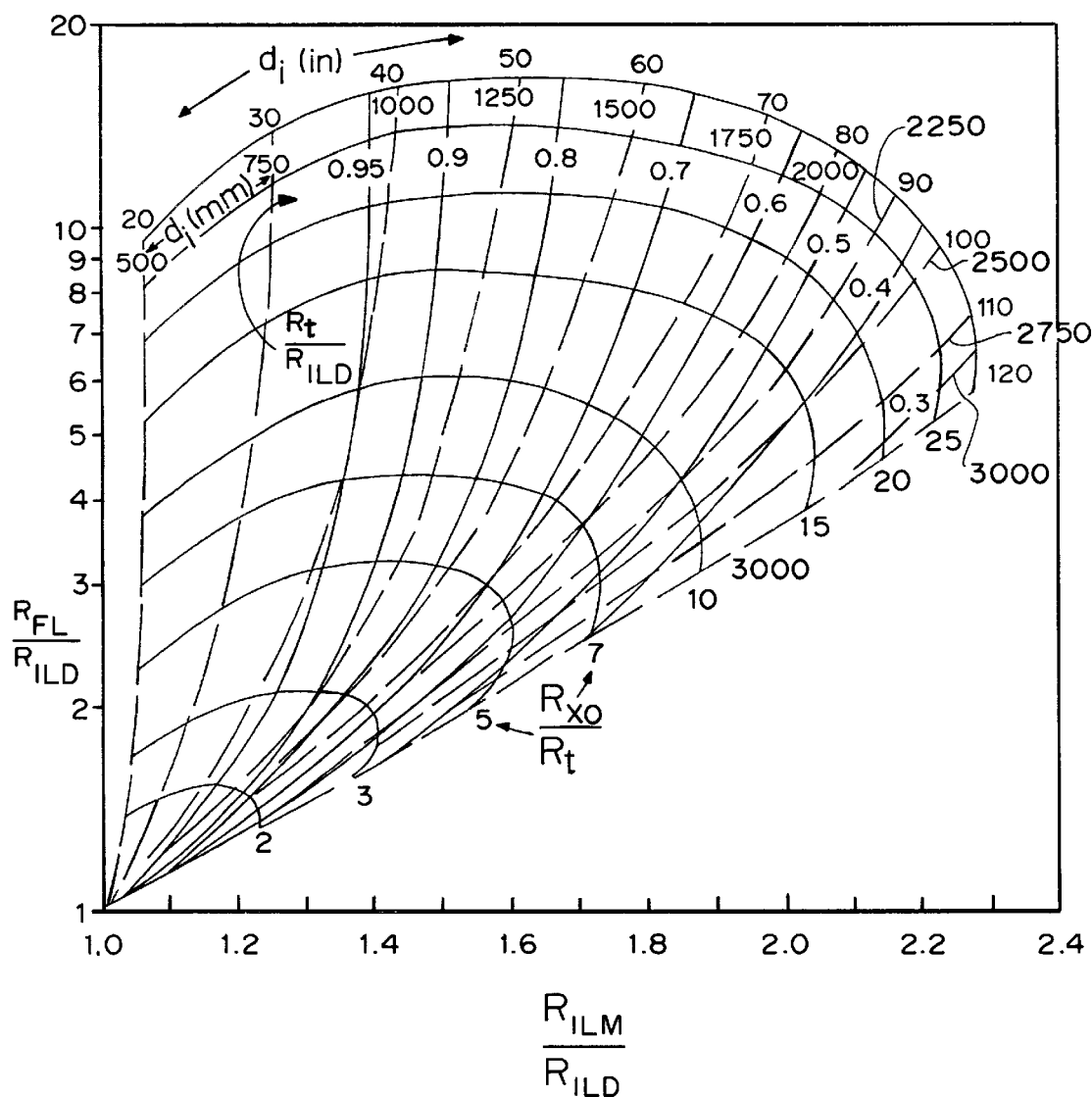
FIG. 7 is a chart for providing a method of determining Rt from the DPIL log readings where $R_t < R_{xo}$.
Figure 8:
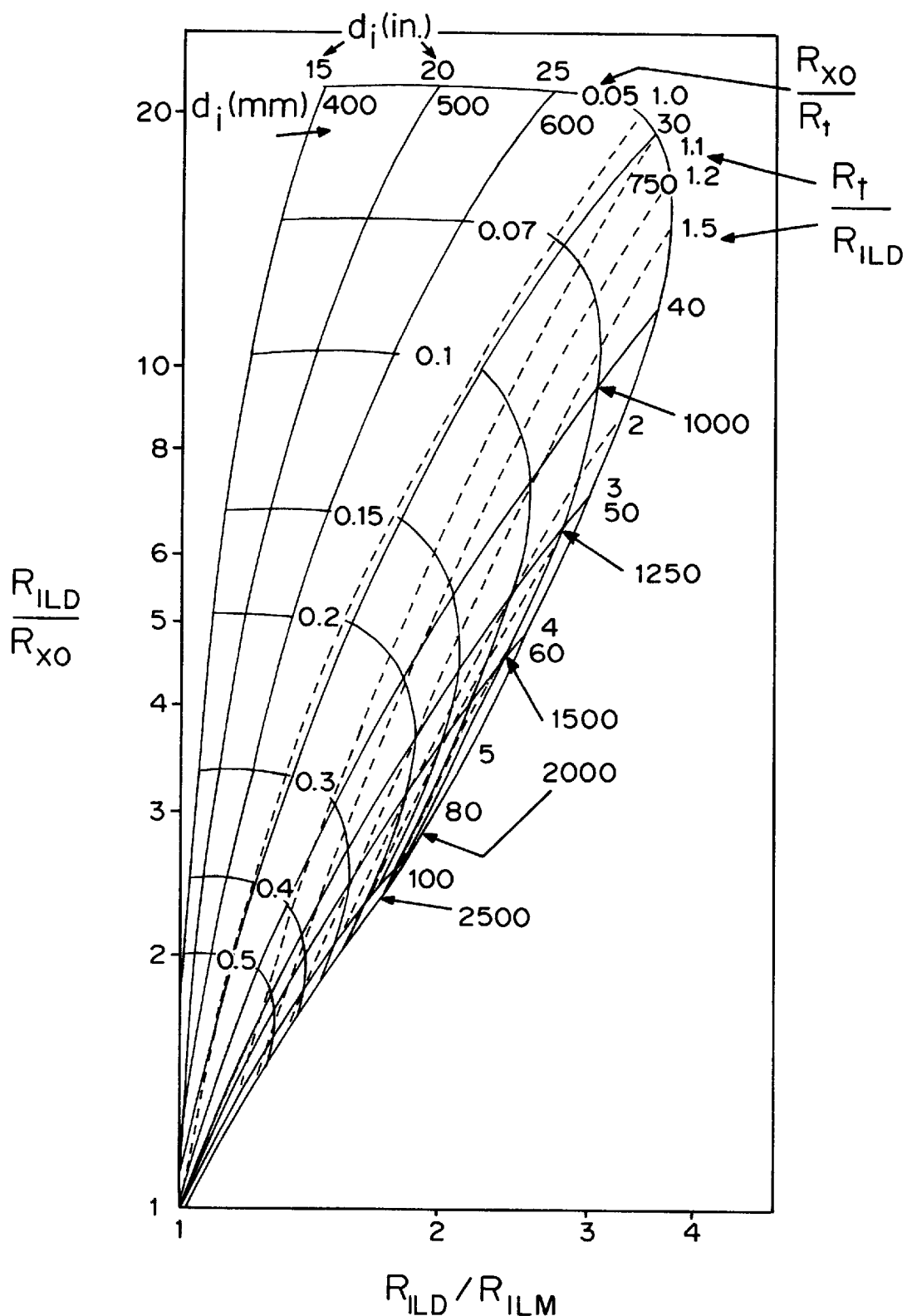
FIG. 8 is a chart for providing a method of determining Rt from the DPIL log readings where $R_t > R_{xo}$.
Figure 9:
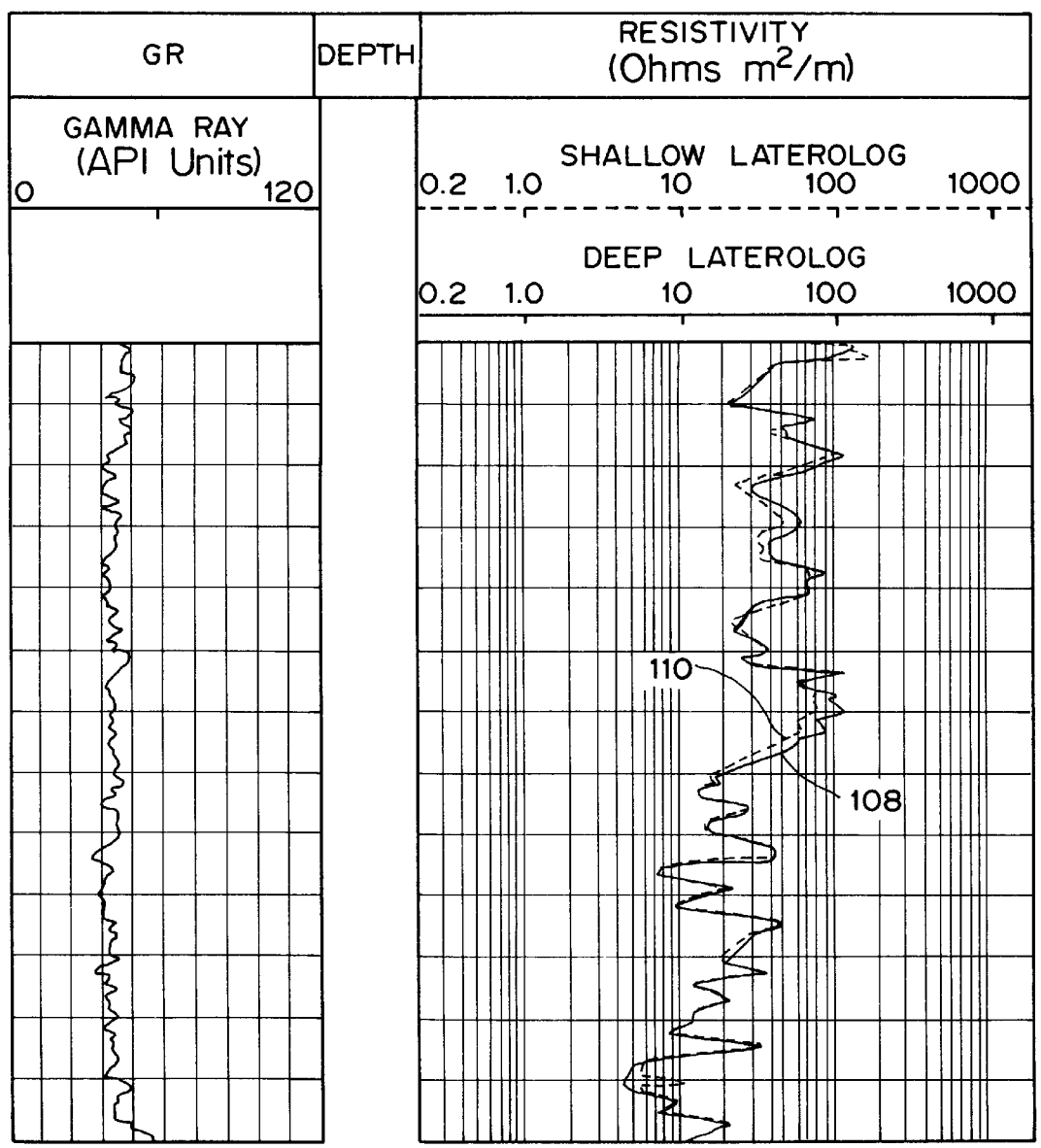
FIG. 9 is an example of a log made using a selected dual laterolog (DLL) instrument showing the DLL deep and shallow responses.
Figure 10:
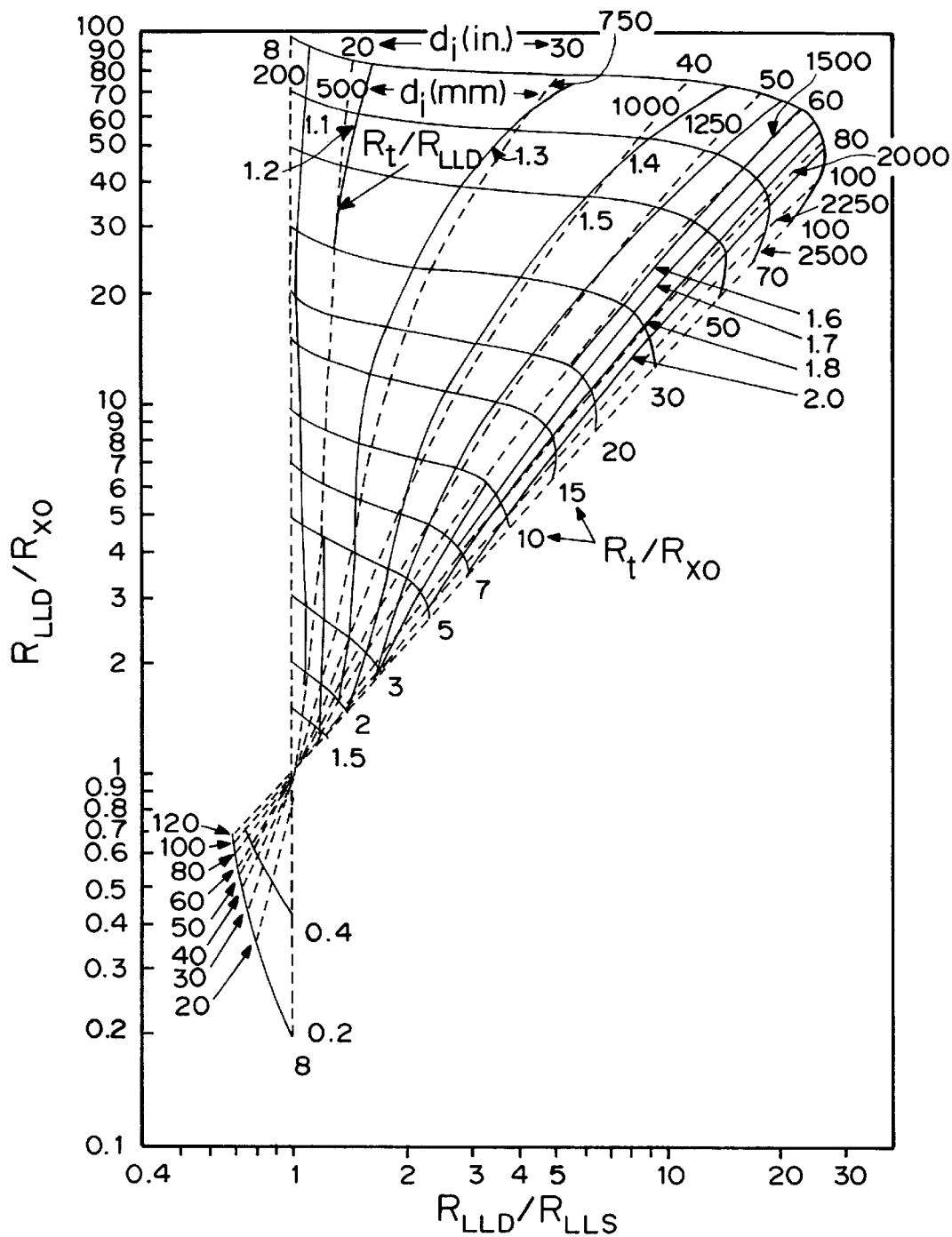
FIG. 10 is a chart for providing a method of determining Rt from DLL log readings as shown in FIG. 9.

The basic operation of the DPIL and SFL instruments identified above as used in the development of the data for this invention is as described above in connection with FIGS. 1 and 2, and is well known in the logging art. As above-described, the selected combination of the DPIL and SFL instruments may be run in a borehole, generating the typical resistivity log as shown in FIG. 6. The DPIL deep response curve is shown at 100, the DPIL medium response curve is shown at 102 and the SFL shallow focused response curve is shown at 104. The value of $R_t$ maybe obtained from standard "tornado" charts, well known in the logging art, and as shown in FIGS. 7 and 8. The chart of FIG. 7 is for the situation where $R_t < R_{xo}$, while the chart of FIG. 8 is for the situation where $R_t > R_{xo}$. The charts of FIGS. 7 and 8 be used to compute logs based on the following equations:

$$R_{FL} = J_{FL} \times R_{xo} + (1 - J_{FL}) \times R_t \qquad (1)$$

$$1/R_{ILM} = G_{ILM}/R_{xo} + (1 - G_{ILM})/R_t \qquad (2)$$

$$1/R_{ILD} = (G_{ILD}/R_{xo}) + (1 - G_{ILD})/R_t \qquad (3)$$

where: $R_{xo}$=resistivity of the formation invaded by the drilling mud;
$R_t$=resistivity of the undisturbed formation;
J=pseudo geometric factor for the SFL at the invasion diameter;
G=geometric factor for the DPIL at the invasion diameter;
FL=SFL shallow log;
ILM=DPIL medium log; and
ILD=DPIL deep log The basic operation of the DLL instrument identified above as used in the development of the data for this invention is as described above in connection with FIGS. 2 and 3, and is well known in the logging art. As above-described, the selected DLL instrument may be run in a borehole and will generate the typical resistivity log as shown in FIG. 9. The DLL deep lateral response curve is identified at 108, while the DLL shallow lateral response curve is shown at 110. For $R_t > R_{xo}$, the value of $R_t$ may be obtained from the example "tornado" chart shown in FIG. 10 in a manner similar to the manner in which the value of Rt was obtained for the DPIL tool as discussed above and which is well known in the logging art.

Figure 11:
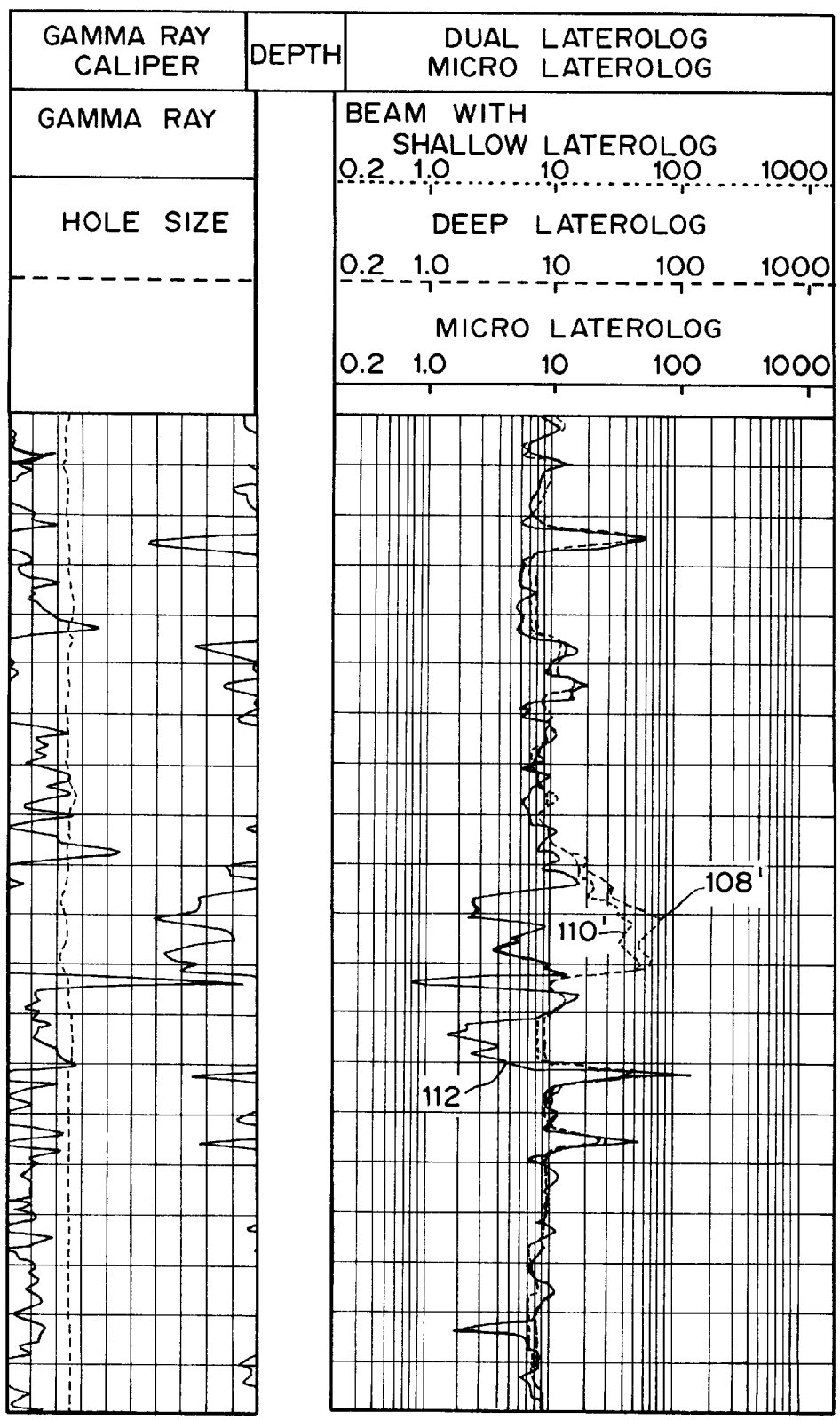
FIG. 11 is an example of a log made using a combination of a selected dual phase induction logging (DPIL) instrument and a selected micro-laterolog (MLL) instrument showing the DLL deep and SLL shallow responses and the MLL response.

The micro laterolog logging (MLL) instrument identified above operates similarly to a shallow lateral logging instrument and is contained in a pad 124 attached to an extendable arm 122 from a tool mandrel 116 as shown in FIG. 12. The arm 122, when extended, forces the pad 124 into contact with the borehole wall. The lateral focusing is created as a result of the individual "button" electrodes 125 and the current is forced laterally into the formation, similar to the lateral focusing shown in FIG. 2, but directionally from the pad 124 in order to measure a small volume of the formation adjacent to the borehole wall and is well known in the logging art. As above-described, the selected MLL instrument may be run in a borehole and will generate the typical resistivity log as shown in FIG. 11 at 112, which in the example shown, was taken simultaneously with a standard DLL instrument. The DLL deep lateral response curve is identified at 108', the DLL shallow lateral response curve is shown at 110', while the MLL response curve is shown at 112. The value of $R_{xo}$ may be obtained from a MLL response in a manner similar to the manner in which the value of $R_t$ was obtained for the DPIL and DLL instruments as discussed above and well known in the logging art.

Figure 14:
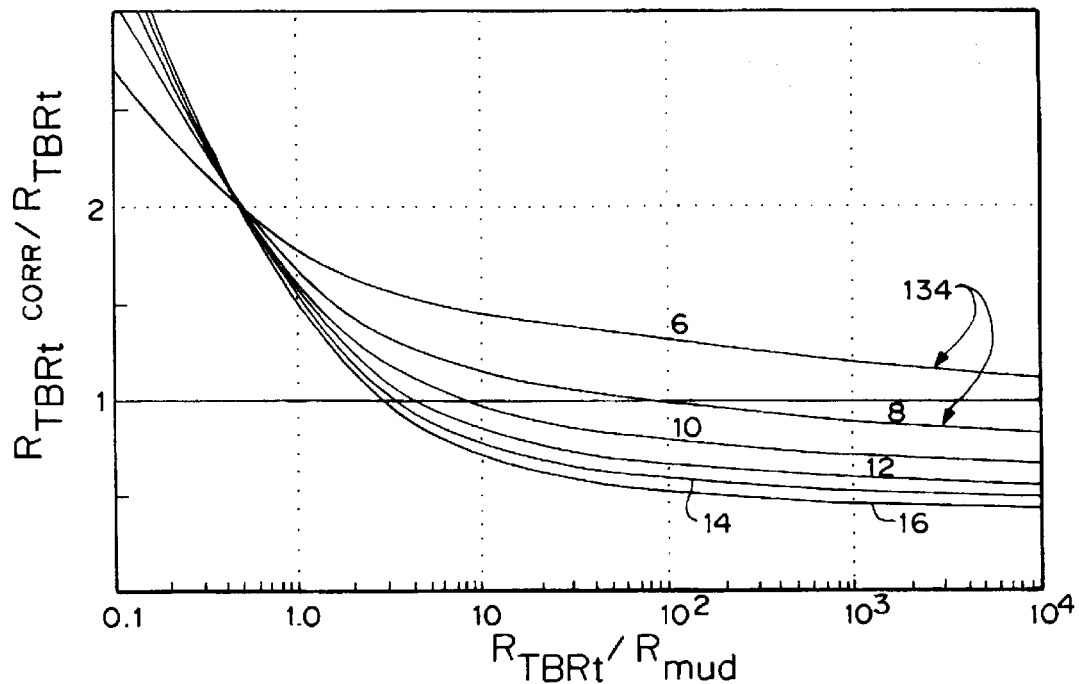
FIG. 14 is a diagram showing two sets of a plurality of response curves for each of the selected TBRT and MLL instruments shown in FIG. 12 for different values of the ratio of $R_t$ to $R_{xo}$.
Figure 13:
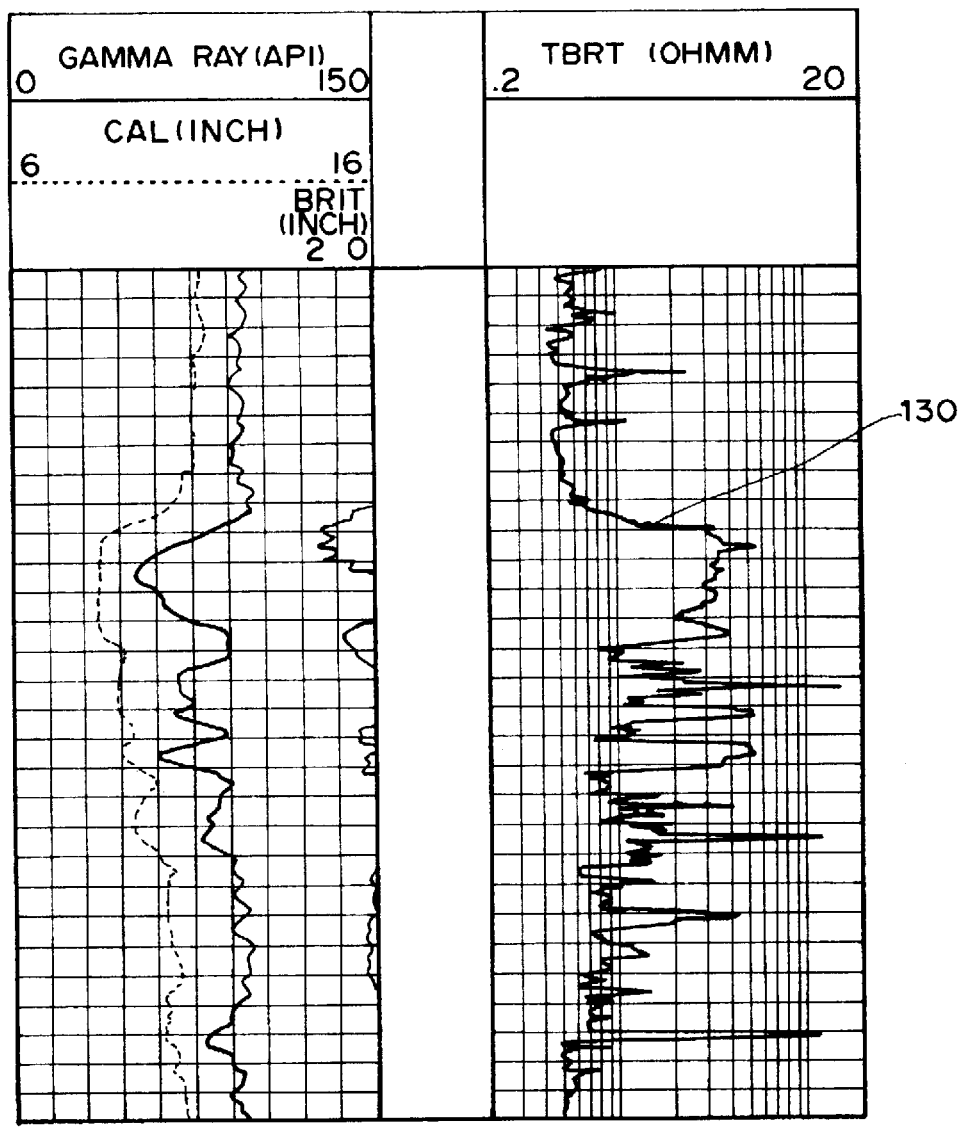
FIG. 13 is an example of a log made using a selected high vertical resolution lateral logging instrument for measuring thin-bed resistivity (TBRT).

FIG. 12 shows a typical tool mandrel 116 for running the TBRT and the MLL instruments above described. The mandrel 116 includes a pair of extendable arms 118 and 122 for carrying pads 120 and 124, respectively. The pad 120 may be the TBRT instrument which is a high-resolution lateral logging instrument. The lateral focusing is created as a result of using the classic "Laterolog-3" (or Guard Log) design well known in the art. The pad 120 design uses a "button" electrode 123 design well known in the art by utilizing long "guard" electrodes which focus the survey current into the formation, similar to the lateral focusing shown in FIG. 2, but directionally from the pad 120 in order to more deeply measure a small volume of the formation adjacent to the borehole. Vertical resolution is determined primarily by the survey electrode vertical length which can be sufficiently short to achieve the desired vertical resolution. The MLL instrument pad 124 operates as hereinabove previously described. A typical resistivity log for the TBRT is shown in FIG. 13. The TBRT response curve is shown at 130. FIG. 14 is an example of a correction chart for borehole corrections to TBRT log readings, where the curves 134 are labelled for various borehole diameters.

Figure 15:
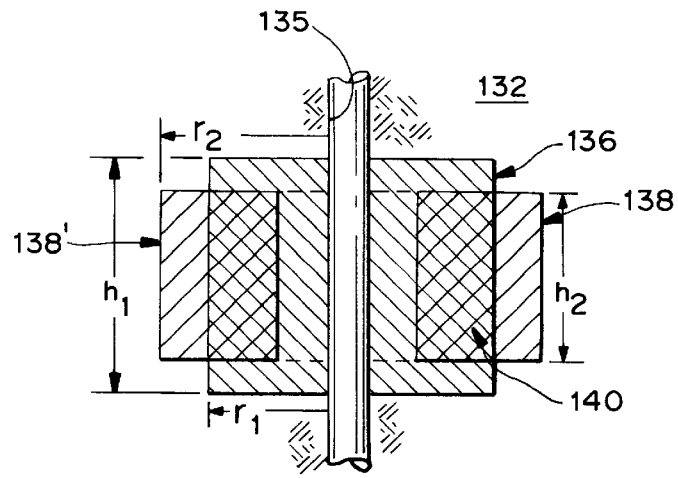
FIG. 15 is a stylized schematic diagram of a borehole penetrating an earth formation showing a common volume of formation surrounding the borehole that is investigated by selected induction and galvanic logging instruments.
Figure 16:
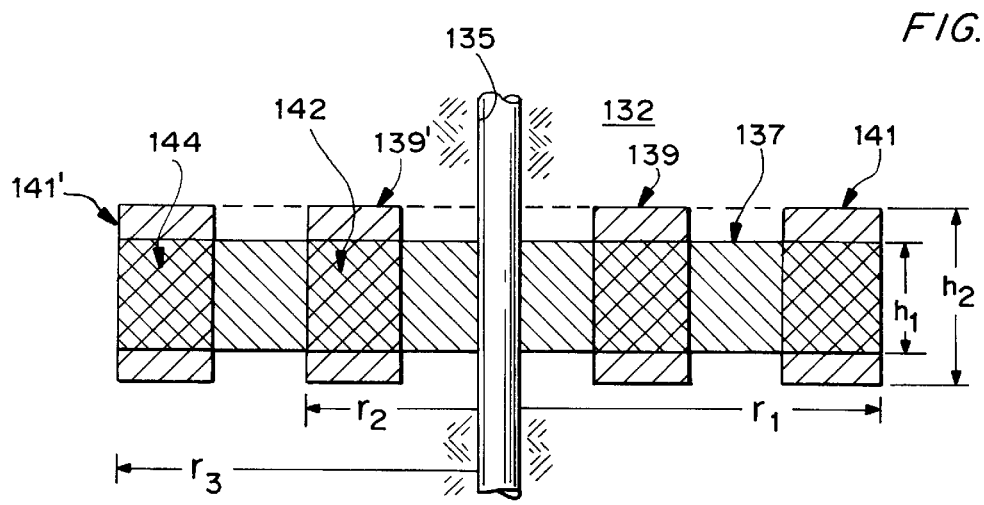
FIG. 16 is a stylized schematic diagram of a borehole penetrating an earth formation showing common multiple volumes of formation surrounding the borehole at radially spaced distances that are investigated by selected induction and galvanic logging instruments.
Figure 17:
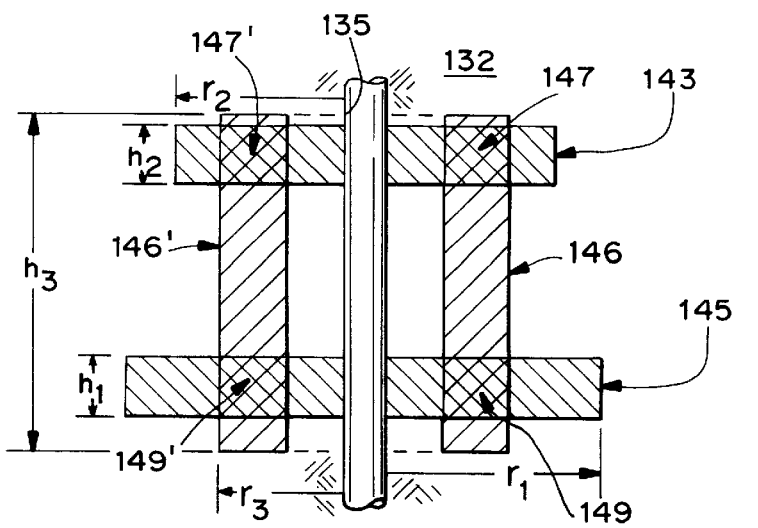
FIG. 17 is a stylized schematic diagram of a borehole penetrating an earth formation showing common multiple volumes of formation surrounding the borehole at vertically spaced distances that are investigated by selected induction and galvanic logging instruments.

Referring to FIGS. 15–17, diagrammatic views of different combinations of volumes of the earth formation surrounding the borehole that may be common to induction and galvanic instruments are shown. In FIG. 15, a borehole 135 is shown penetrating an earth formation 132, and a shaded area 136, representing a three-dimensional cylindrical volume surrounding the borehole (having a radius $r_1$ and a height $h_1$), which may be the volume investigated by a selected galvanic instrument. The shaded volume 138–138' radially displaced from the borehole, represents a three-dimensional "doughnut" shaped volume surrounding the borehole (having an outer radius of $r_2$ and a height dimension $h_2$), may be the volume investigated by a selected induction instrument. The two volumes 136 and 138–138' overlap in a common volume 140 (represented by the cross-hatched area) that is investigated by both the galvanic and induction instruments.

FIG. 16 shows the earth formation 132 penetrated by a borehole 135 surrounded by a radially extending shaded area 137, representing a three-dimensional cylindrical volume surrounding the borehole (having a radius of $r_2$ and a height $h_1$) which may represent a volume investigated by a selected galvanic instrument having a greater radius of penetration than the galvanic instrument producing the volume 136 shown in FIG. 15. The shaded "doughnut"-shaped volume 139–139' (having an outer radius of $r_2$ and a height dimension of $h_2$) represents one radially spaced three-dimensional volume surrounding the borehole which may be investigated by a selected induction instrument. Similarly, the shaded "doughnut"-shaped volume 141–141' (having an outer radius of $r_3$ and a height of $h_2$, approximately the height of the volume 139–139') represents a second radially spaced three-dimensional volume surrounding the borehole and radially spaced from the first such volume 139–139' and may also be the volume investigated by a second selected induction instrument. The volumes 137, 139–139' and 141–141' form overlapping common volumes 142 and 144 represented by the "cross-hatched" areas having a height $h_1$ and the outer radii of $r_1$ and $r_2$, respectively. The volumes 139–139' and 141–141' are radially displaced from the borehole at different radial distances and constitute common volumes of formation investigated by the combination of galvanic and induction logging instruments.

In FIG. 17, the earth formation 132 is shown penetrated by a borehole 135 and surrounded by a pair of radially extending and vertically-spaced shaded areas 143 and 145 that each represents a three-dimensional cylindrical volume surrounding the borehole and having a radius x height combination $r_2 \times h_2$ and $r_1 \times h_1$, respectively, where $h_1$ and $h_2$ are vertically spaced apart along the borehole, and which may represent a volume investigated by a pair of different selected galvanic instruments or a single galvanic instrument having differing depths of penetration. The shaded "doughnut" -shaped volume 146–146' (having an outer radius of $r_3$ and a height of $h_3$) represents one radially spaced three-dimensional volume surrounding the borehole which may be investigated by a selected induction instrument. The different volumes 143, 145 and 146–146' form common overlapping volumes 147–147' and 149–149', represented by the "cross-hatched" areas having an outer radius $r_3$ and spaced-apart vertical heights $h_2$ and $h_1$ respectively. The volumes 147–147' and 149–149' are radially spaced about the borehole and vertically spaced apart at different distances and constitute a common volume of formation investigated by the combination of galvanic and induction logging instruments.

Figure 18:
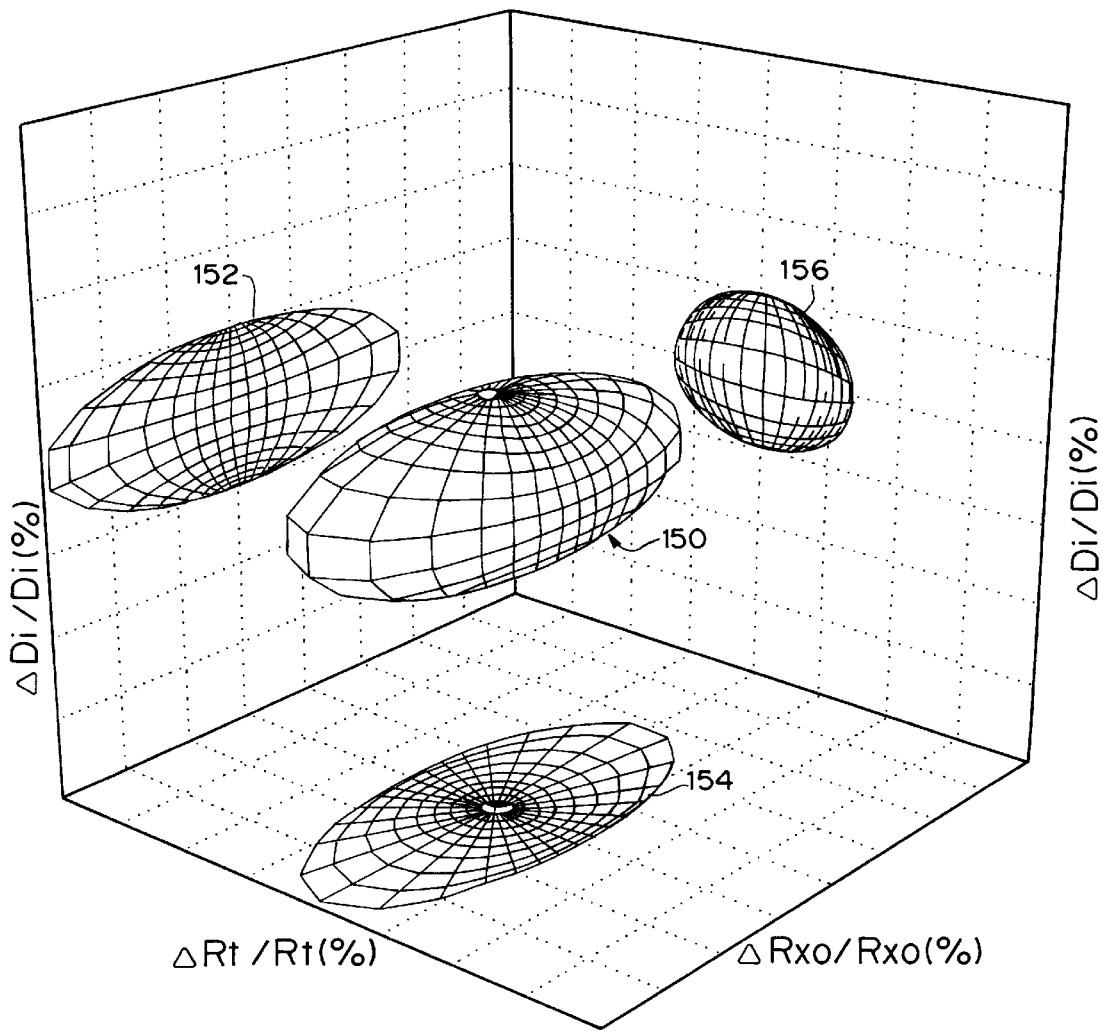
FIG. 18 is a diagram showing a three-dimensional representation of an illustrative conceptual example of ellipsoids of confidence for percentage deviations of the parameters Rt, Rxo, and Di for the earth model shown in FIG. 5 projected to the axes of the earth model parameters for the induction and lateral logging instruments referred to in FIGS. 6–14.

The next step in this illustration of the preferred embodiment of the method of combining galvanic and induction tool responses is the depiction of the predicted responses of combinations of the above described induction and lateral logging instruments, which is accomplished by calculating ellipsoids of confidence that form a "three-dimensional" surface of the type shown at 150 in FIG. 18. The technique of calculating the ellipsoids of confidence as shown at 150 will now be described.

If all of the n measurements are put in a sequence as follows:

$$\vec{f} = \begin{pmatrix} f_1 \\ f_2 \\ \cdot \\ \cdot \\ \cdot \\ f_n \end{pmatrix} \quad (4)$$

and all of the m model parameters are put in a sequence as follows:

$$\vec{p} = \begin{pmatrix} p_1 \\ \cdot \\ \cdot \\ \cdot \\ p_m \end{pmatrix} \quad (5)$$

then the components of vector f are functions of vector p as follows:

$$\vec{f} = \vec{f}(\vec{p}) \quad (6)$$

If $\vec{p}_o$ is an estimated (a priori) model and $\vec{f}_o$ is a response from this model, then the difference $(\vec{f} - \vec{f}_o)$ may be represented in the form:

$$(\vec{f} - \vec{f}_o) = \hat{D}(\vec{p} - \vec{p}_o) \quad (7)$$

where $\hat{D}$ is a matrix n×m of partial derivatives of $\vec{f}$ with respect to $\vec{p}$ as follows:

$$D_{ij} = \frac{\partial f_i}{\partial p_j} \quad (8)$$

where i=1,n;
j=1,m;

The same formula for $(\vec{f} - \vec{f}_o)$ can be represented in terms of relative deviations:

$$\delta f = \tilde{D} \vec{\delta p} \quad (9)$$

$$\text{where: } \vec{\delta f_1} = \frac{f_i - f_o}{f_{oi}}$$

$$\delta p_j = \frac{P_j - P_{oj}}{P_j} \quad (10)$$

$$D_{ij} = \frac{\partial \ln f_i}{\partial \ln p_j} \quad (11)$$

If data errors are distributed normally by calculating $X^2$–statistics of $\vec{\delta f}$, we obtain the following:

$$X^2 (\vec{\delta f}^T \overline{\overline{\Sigma}} \vec{\delta f}) = X^2(\delta p^T[D^T \overline{\Sigma} D] \vec{\delta p}) \quad (12)$$

where: $\overline{\overline{\Sigma}}$ is the matrix of the second moments of the random vector $\vec{f}$.

It follows from equation (12) that the surfaces of constant values of $X^2$ statistics argument are the surfaces under consideration which are ellipsoidal in shape:

$$(\delta p^T D^T \overline{\Sigma} D \, \delta p^T) = [X^2]^{-1}(c) \quad (13)$$

where c is a given confidence level.

For the modelling herein described, the assumption is made that the noise is randomly distributed and the data is measured with an accuracy of one percent (1.0%). It is also required that the confidence level (c) of the interpreted model parameter is at ninety-five percent (95.0%). The axes of the three-dimensional coordinate system shown in FIG. 18 are labeled for the percentage deviations from the earth model parameters values $R_{xo}$, $R_t$ and $D_i$. The mud resistivity is assumed to be known since it is routinely measured and corrected for temperature when applying standard logging techniques. As shown in the example of FIG. 18, the ellipsoids of confidence really form a three-dimensional surface 150, and it is hard to visualize the range of the confidence levels or values. Accordingly, if the ellipsoids of confidence of the surface 150 are projected onto each of the three axes of the percentage deviations of the parameters $R_{xo}$, $R_t$ and $D_i$ in FIG. 18, the projected images will be as seen as projected two-dimensional ellipsoid images 152 along axis ($\Delta D_i/D_i$, $\Delta R_{xo}/R_{xo}$), 154 along axis ($\Delta R_t/R_t$, $\Delta R_{xo}/R_{xo}$) and 156 ($\Delta D_i/D_i$, $\Delta R_t/R_t$). From such projections, one can visualize the range of uncertainties in the interpreted parameters.

Assuming the A-type model of formation as previously described, with the following known parameters: $R_m=1$, $R_{xo}=10$, $R_t=100$, $D_{bh}=8$ in., and $D_i=60$ in., it has been found useful that comparison error ellipsoids may be determined for the following combinations of the selected induction and lateral logging instruments hereinabove described:

1. Combination of DPIL+SFL;
2. Combination of DPIL+SFL+MLL+TBRT;
3. Combination of DLL+TBRT+MLL; and
4. Combination of DPIL+SFL+DLL+MLL+TBRT.

Of course, other combinations may be used, and the invention is certainly not restricted to the above listed or described combinations of induction and lateral logging instruments and responses. However, the above-described combinations were used and such combinations achieved the desired results.

Figure 19:
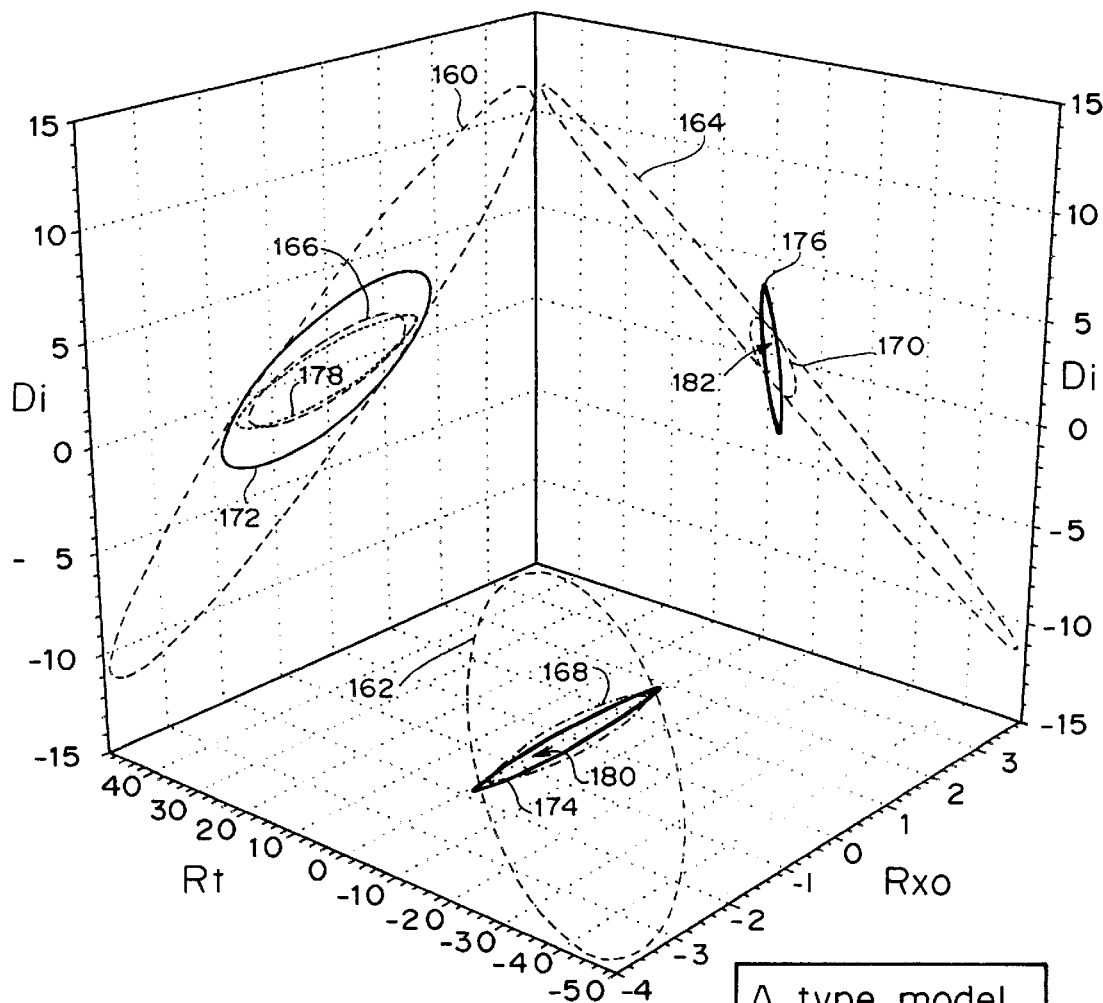
FIG. 19 is a diagram showing the ellipsoids of confidence for percentage deviations of the earth model parameters $R_t$, $R_{xo}$, and $D_i$ for a first selected earth model using preselected combinations of the induction and lateral logging instruments referred to in FIGS. 6–14.

Using a joint inversion mathematical interpretation technique, the error ellipsoids for the A-type model formation and the four (4) combinations of induction and lateral logging instruments as above described are calculated. The "joint inversion" technique used is preferably of the type disclosed by Strack, "Exploration with Deep Transient Electromagnetics," Elsevier, 1993, which technique is hereby incorporated for all purposes. The comparisons of the error ellipsoids for the A-type model formation and the four tool combinations are shown in FIG. 19. The combination of the DPIL and the SFL responses have the largest error as shown by the ellipsoid projections for the combination of the DPIL (induction response)+the SFL (shallow galvanic logging response) shown as curves 160, 162 and 164. Combining these responses with the responses of the TBRT and MLL (galvanic logging instruments) significantly improves the error situation, as shown by curves 166, 168 and 170. However, if the induction instrument (DPIL) and spherically focused lateral logging responses (SFL) are removed and the dual lateral logging (DLL) responses are added, the error gets worse as is shown by the larger curves 172, 174 and 176. On the other hand, if the responses of all of the instruments are combined, the error curves are substantially reduced as shown by the curves 178, 180 and 182 (the curve 182 is substantially covered by and obstructed by the larger curve 176). The improvement of error varies with the measurement of the various parameters by factors of 3 to 15.

Figure 20:
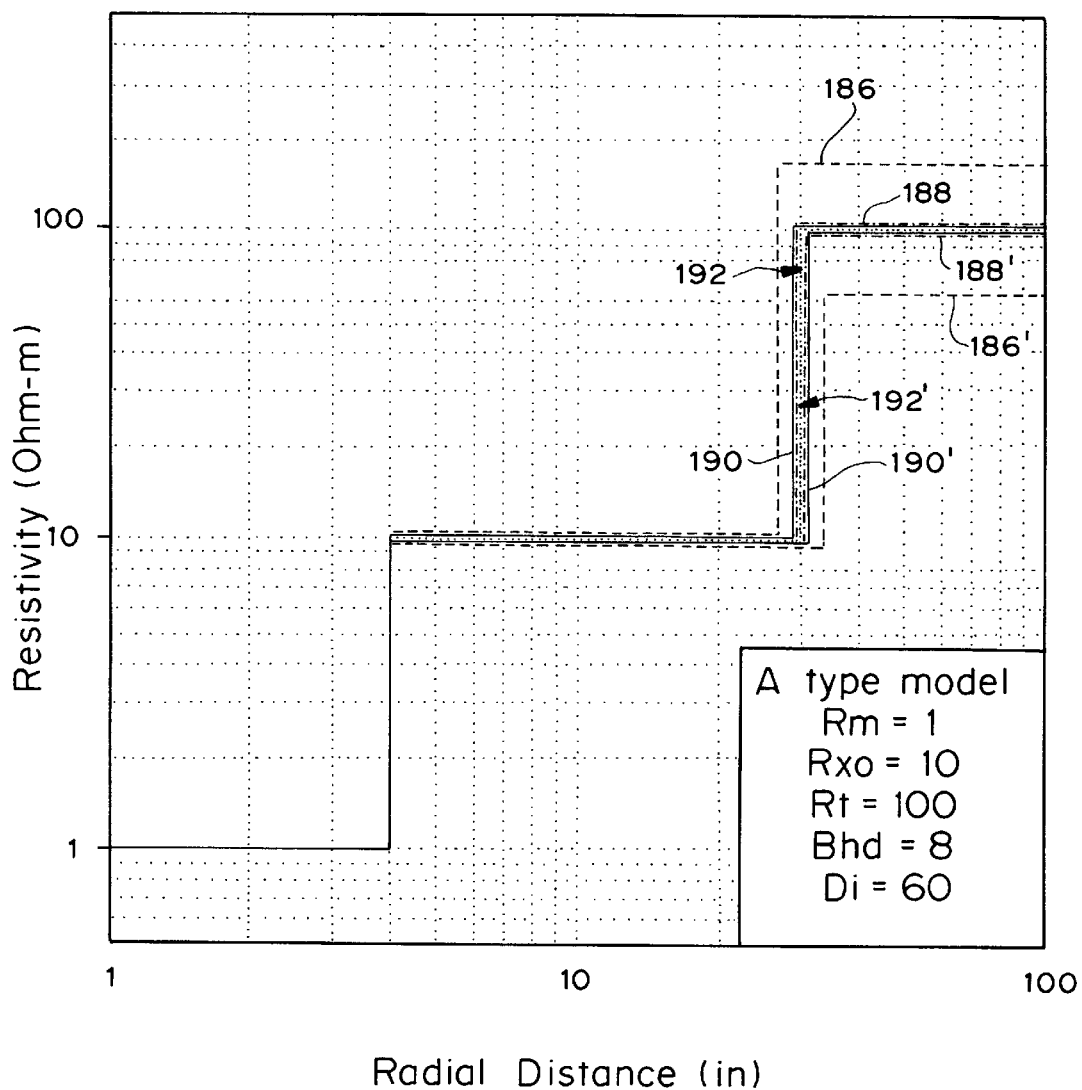
FIG. 20 is a diagram showing a plot of the formation resistivity vs. the radial distance or depth into the formation for reflecting the confidence level envelopes of the ellipsoids of confidence shown in FIG. 19 for the first selected earth model using the preselected combinations of the induction and lateral logging instruments.

The information shown in the diagram of FIG. 19 can also be displayed in the form of a logarithmic model plot as shown in FIG. 20, where the true model is depicted by the single line towards the center of the suite of curves for each of the induction and/or lateral logging tool combinations. The measurement uncertainties as resulting from each of the various combinations are represented by pairs of lines either side of the true value. The combination for the DPIL+SFL is shown by the uncertainty envelopes defined by the curves 186 and 186'. The uncertainty envelope for the combination of the DPIL+SFL+MLL is shown by the curves 188 and 188'. The uncertainty envelope for the combination of the DLL+TBRT+MLL is shown by the curves 190 and 190', while the uncertainty envelope for the combination of all tools is shown by the curves 192 and 192'.

Figure 21:
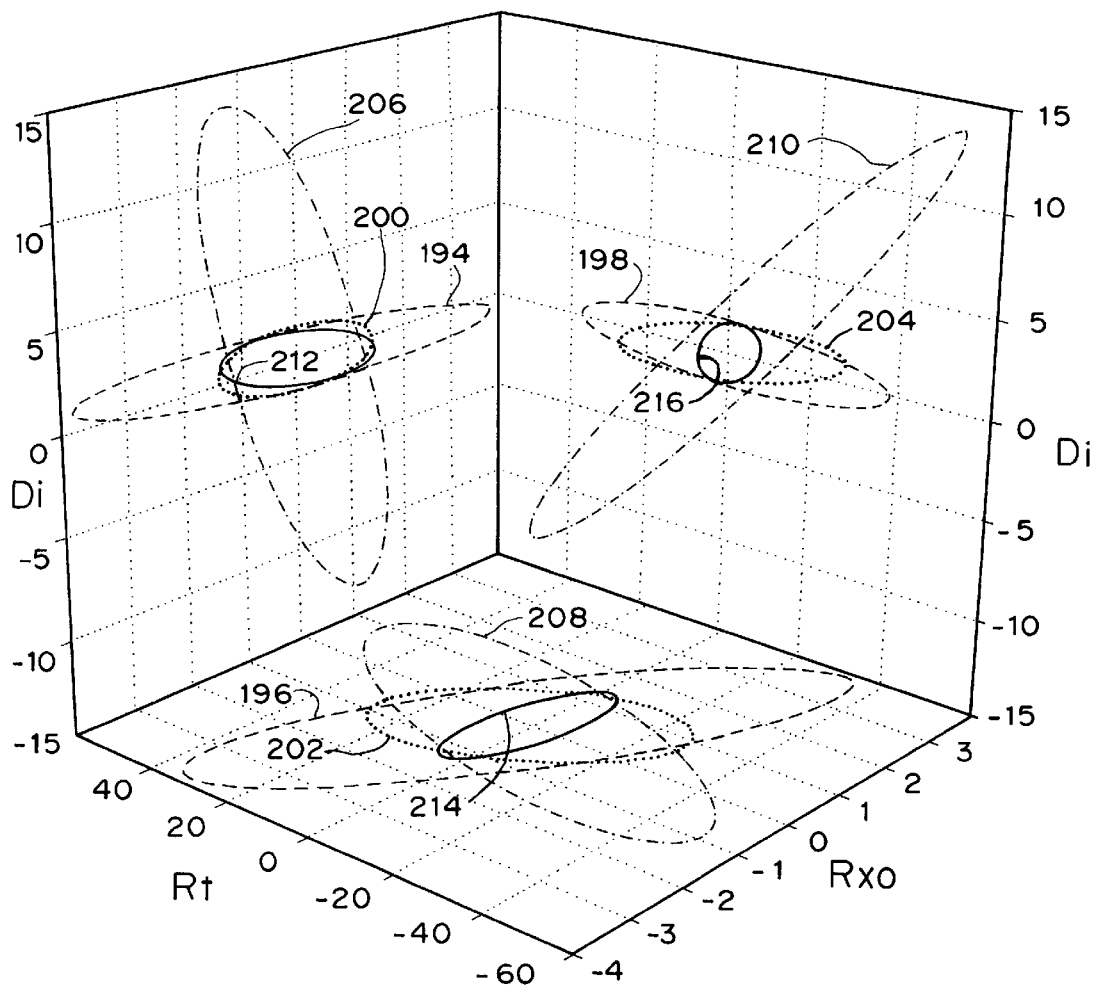
FIG. 21 is a diagram showing the ellipsoids of confidence for percentage deviations of the earth model parameters $R_t$, $R_{xo}$, and $D_i$ for a second selected earth model using preselected combinations of the induction and lateral logging instruments.

If it is assumed that the Q-type model formation has the following known parameters: $R_m=10$, $R_{xo}=1$, $R_t=0.1$, $D_{bh}=8$ in. and $D_i=60$ in., then using the four (4) combinations of induction and galvanic logging instruments as hereinabove described, the joint inversion technique will calculate the error ellipsoids for each such combination in the same manner as above described for the A-type model formation. The comparisons of the error ellipsoids for the Q-type model formation and the four tool combinations are shown in FIG. 21. The combination of the DPIL+SFL responses (primarily the inductive response) have a large error as reflected by the ellipsoid projections for the combination of the DPIL (induction response)+the SFL (shallow galvanic logging response) shown as curves 194, 196 and 198. Again, combining these responses with the responses of the TBRT+MLL (galvanic logging instruments) significantly improves the error situation, as shown by curves 200, 202 and 204.

However, if the DPIL+SFL responses are removed and the dual lateral logging (DLL) responses are added (substantially only lateral focused responses), the error is even greater as is shown by the larger curves 206, 208 and 210. As is true for the A-type model formation, if the responses of all of the instruments are combined, the error curves are substantially reduced as shown by the curves 212, 214 and 216.

Figure 22:
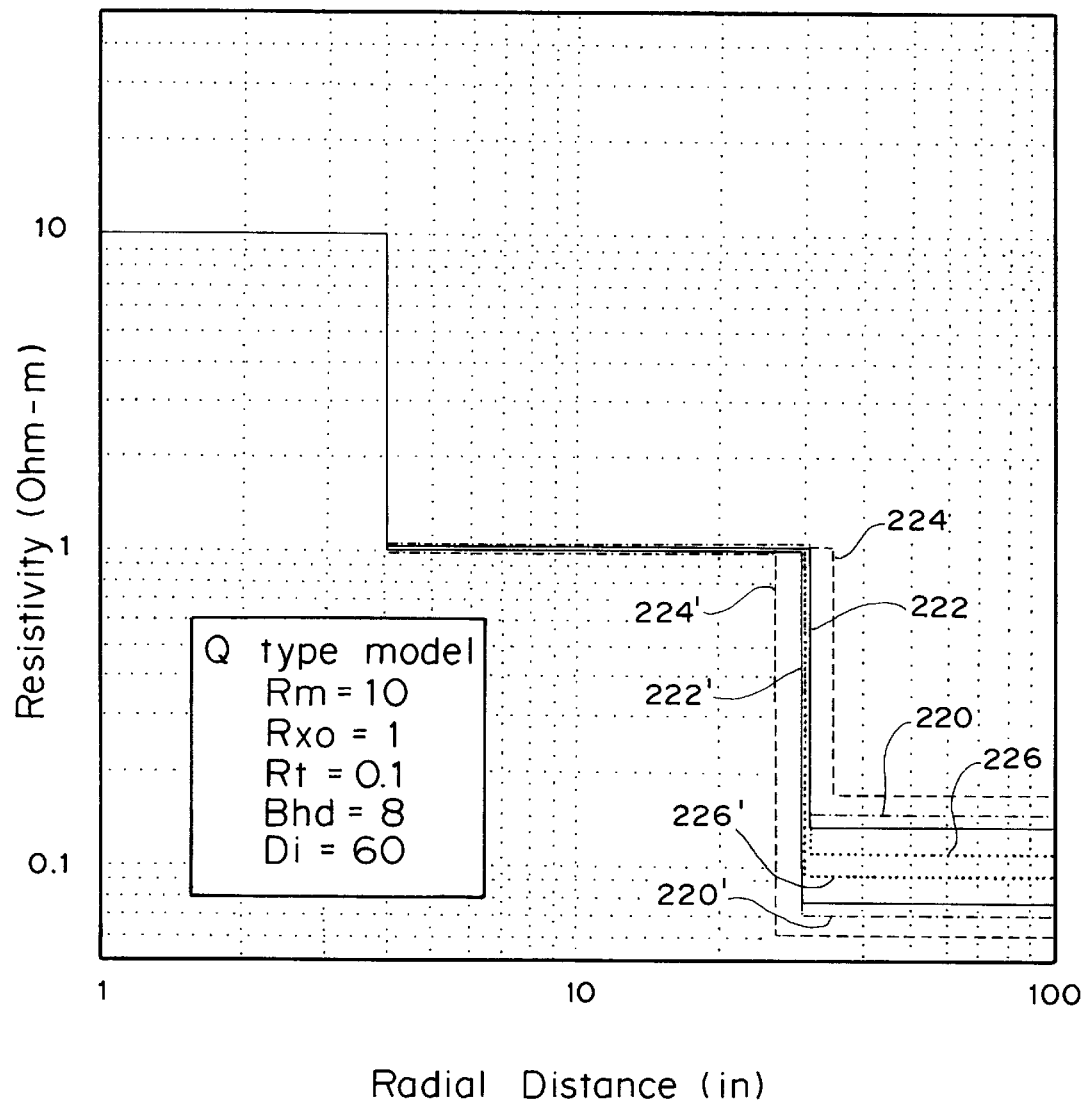
FIG. 22 is a diagram showing a plot of the formation resistivity vs. the radial distance or depth into the formation for reflecting the confidence level envelopes of the ellipsoids of confidence shown in FIG. 21 for the second selected earth model using the preselected combinations of the induction and lateral logging instruments.

The information shown in the diagram of FIG. 21 can also be displayed in the form of a logarithmic model plot as shown in FIG. 22, where the true model is always towards the center of the suite of curves for each of the induction and/or lateral logging tool combinations. The combination for the DPIL+SFL is shown by the uncertainty envelopes defined by the curves 220 and 220'. The uncertainty envelope for the combination of the DPIL+SFL+MLL+TBRT is shown by the curves 222 and 222'. The uncertainty envelope for the combination of the DLL+TBRT+MLL is shown by the curves 224 and 224', while the uncertainty envelope for the combination of all tools is shown by the curves 226 and 226'.

Figure 23:
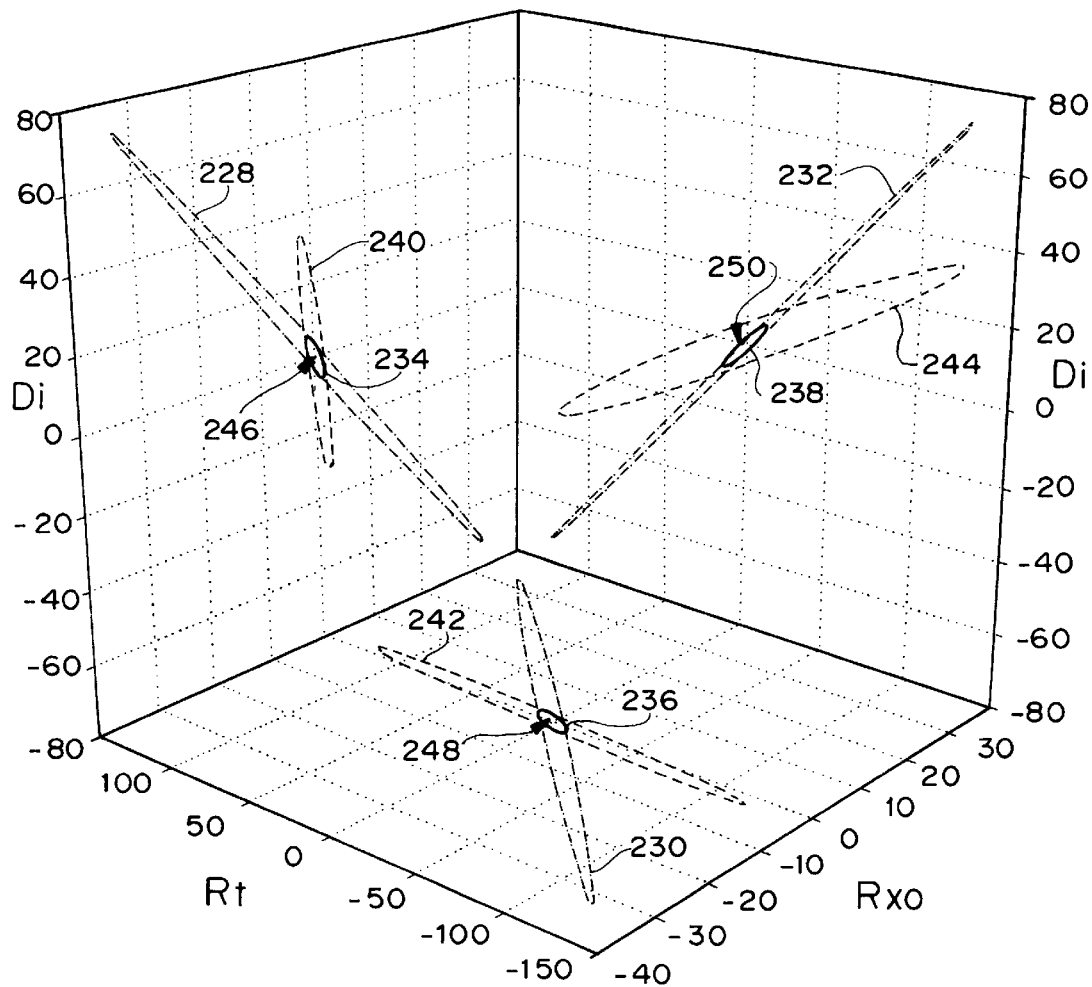
FIG. 23 is a diagram showing the ellipsoids of confidence for percentage deviations of the earth model parameters $R_t$, $R_{xo}$, and $D_i$ for a third selected earth model using preselected combinations of the induction and lateral logging instruments.

In the third case, assume the K-type model formation has the following known parameters: $R_m=1$, $R_{xo}=10$, $R_t=1$, $D_{bh}=8$ in. and $D_i=60$ in., and the four (4) combinations of induction and galvanic logging instruments are used as hereinabove described, then the error ellipsoids for each such combination can be calculated in the same manner as above described for the A-type model formation. The comparisons of the error ellipsoids for the K-type model formation and the four tool combinations are shown in FIG. 23. The combination of the DPIL+SFL responses (primarily the inductive response) has the largest error as reflected by the ellipsoid projections for the combination of the DPIL (induction response)+the SFL (shallow galvanic logging response) shown as curves 228, 230 and 232. If the first combination is further combined with the responses of the MLL+TBRT (lateral logging instruments) the error situation is significantly improved, as shown by curves 234, 236 and 238. However, if the DPIL+SFL responses are removed and the dual lateral logging (DLL) responses added (substantially only lateral focused responses), the error is even greater as is shown by the larger curves 240, 242 and 244. If the responses of all of the instruments are combined, the error curves are substantially reduced as shown by the curves 246, 248 and 250, which are substantially coincident with the curves 234, 236 and 238 of the combination of the DPIL+SFL+MLL+TBRT instrument responses.

Figure 24:
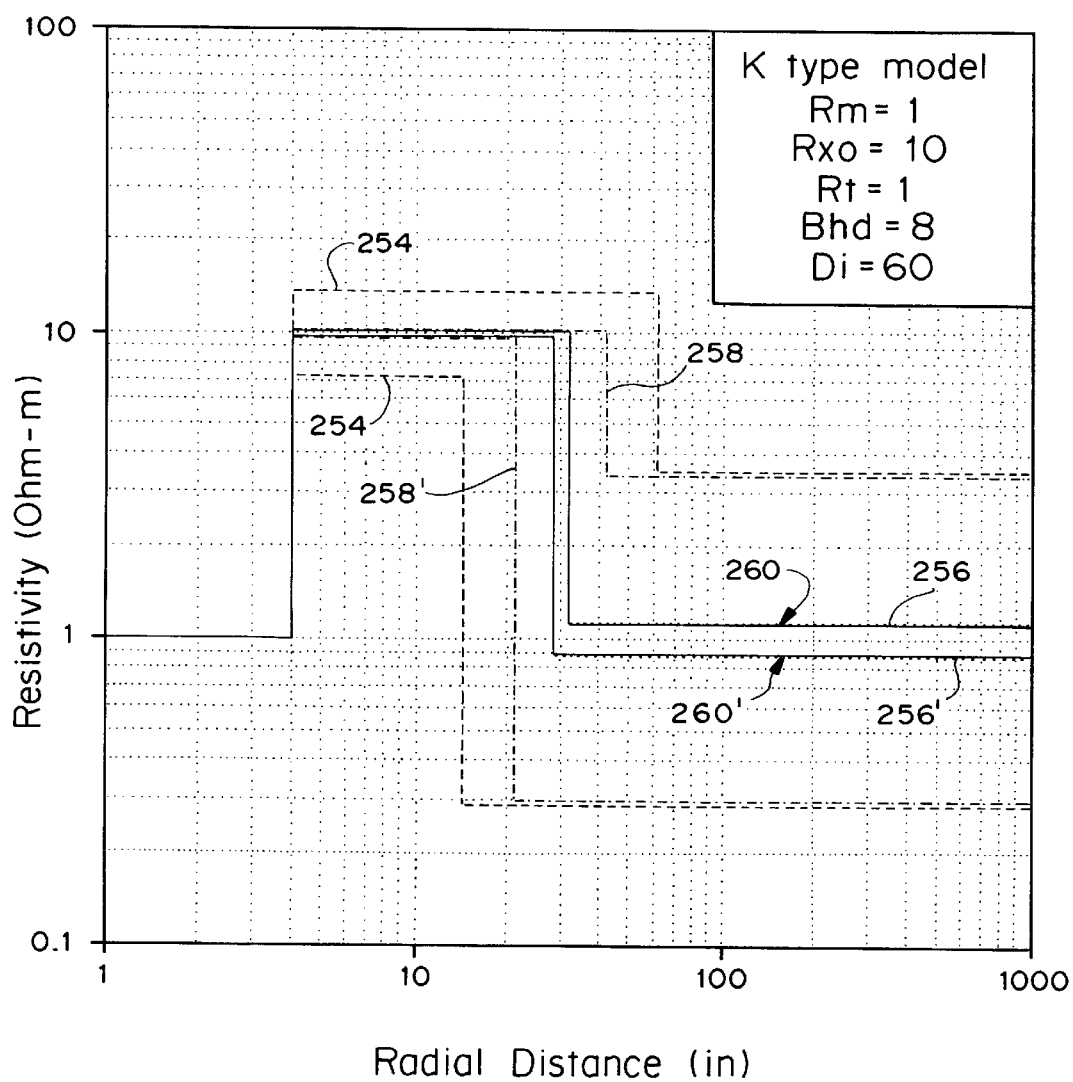
FIG. 24 is a diagram showing a plot of the formation resistivity vs. the radial distance or depth into the formation for reflecting the confidence level envelopes of the ellipsoids of confidence shown in FIG. 23 for the third selected earth model using the preselected combinations of the induction and lateral logging instruments.

As previously shown in FIGS. 20 and 21, the information shown in the diagram of FIG. 23 for the K-type of formation model can also be displayed in the form of a logarithmic model plot as shown in FIG. 24, where the true model is always towards the center of the suite of curves for each of the induction and/or galvanic logging tool combinations. The combination for the DPIL+SFL is shown by the largest uncertainty envelope defined by the curves 254 and 254'. The uncertainty envelope for the combination of the DPIL+SFL+MLL+TBRT is shown by the curves 256 and 256'. The uncertainty envelope for the combination of the DLL+TBRT+MLL is shown by the curves 258 and 258', which shows a much enlarged error of uncertainty. The uncertainty envelope of the combination of all tools is shown by the curves 260 and 260', which are seen to virtually coincide with the curves 256 and 256' of the combination of the DPIL+SFL+MLL+TBRT.

Figure 25:
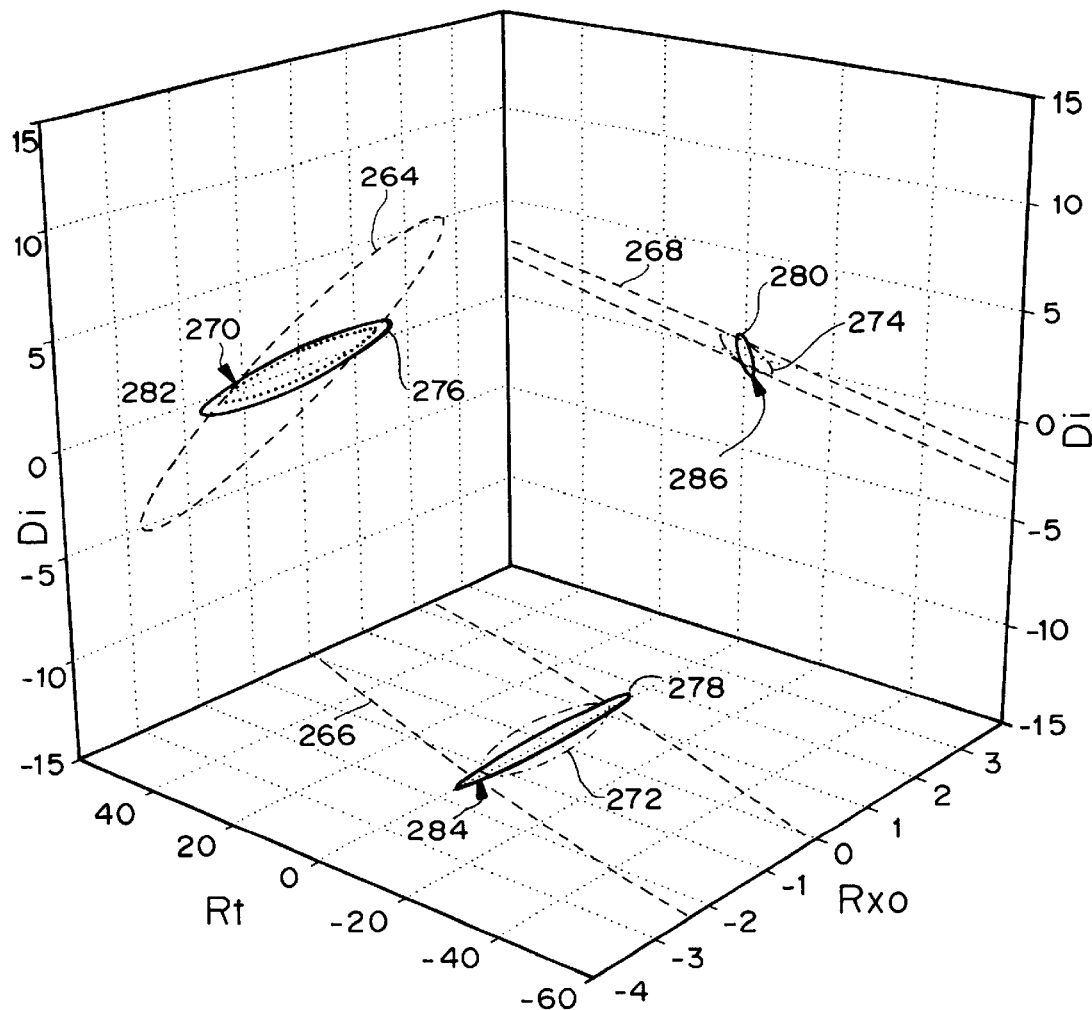
FIG. 25 is a diagram showing the ellipsoids of confidence for percentage deviations of the earth model parameters $R_t$, $R_{xo}$, and $D_i$, for a fourth selected earth model using preselected combinations of the induction and lateral logging instruments.

In the last case, assuming that the H-type model formation has the following known parameters: $R_m=10$, $R_{xo}=1$, $R_t=100$, $D_{bh}=8$ in. and $D_i=60$ in., and that the four (4) combinations of induction and lateral logging instruments are used as hereinabove described, then the error ellipsoids for each such combination can be calculated in the same manner as above described for the other type of model formations. The comparisons of the error ellipsoids for the H-type model formation and the four tool combinations are shown in FIG. 25. The combination of the DPIL+SFL responses primarily the inductive response) has the largest error as reflected by the ellipsoid projections for the combination of the DPIL (induction response)+the SFL (shallow galvanic logging response) shown as curves 264, 266 and 268. Further combining the first combination with the responses of the MLL+TBRT (galvanic logging instruments) the error situation is significantly improved, as shown by curves 270 (the curve 270 is substantially covered by the larger curves 276 and 282 for the other combinations as will hereinafter be described), 272 and 274. As in the earlier cases, if the DPIL+SFL responses are removed and the dual lateral logging (DLL) responses added (substantially only lateral focused responses), the error is greater as is shown by the larger curves 276, 278 and 280. Combining all of the responses for all of the instruments causes all of the error curves to be substantially reduced as shown by the curves 282, 284 and 286. The curves 284 and 286 are substantially coincident with the larger curves 278 and 280 of the combination of the DLL+TBRT+MLL and are obscured in FIG. 25.

Figure 26:
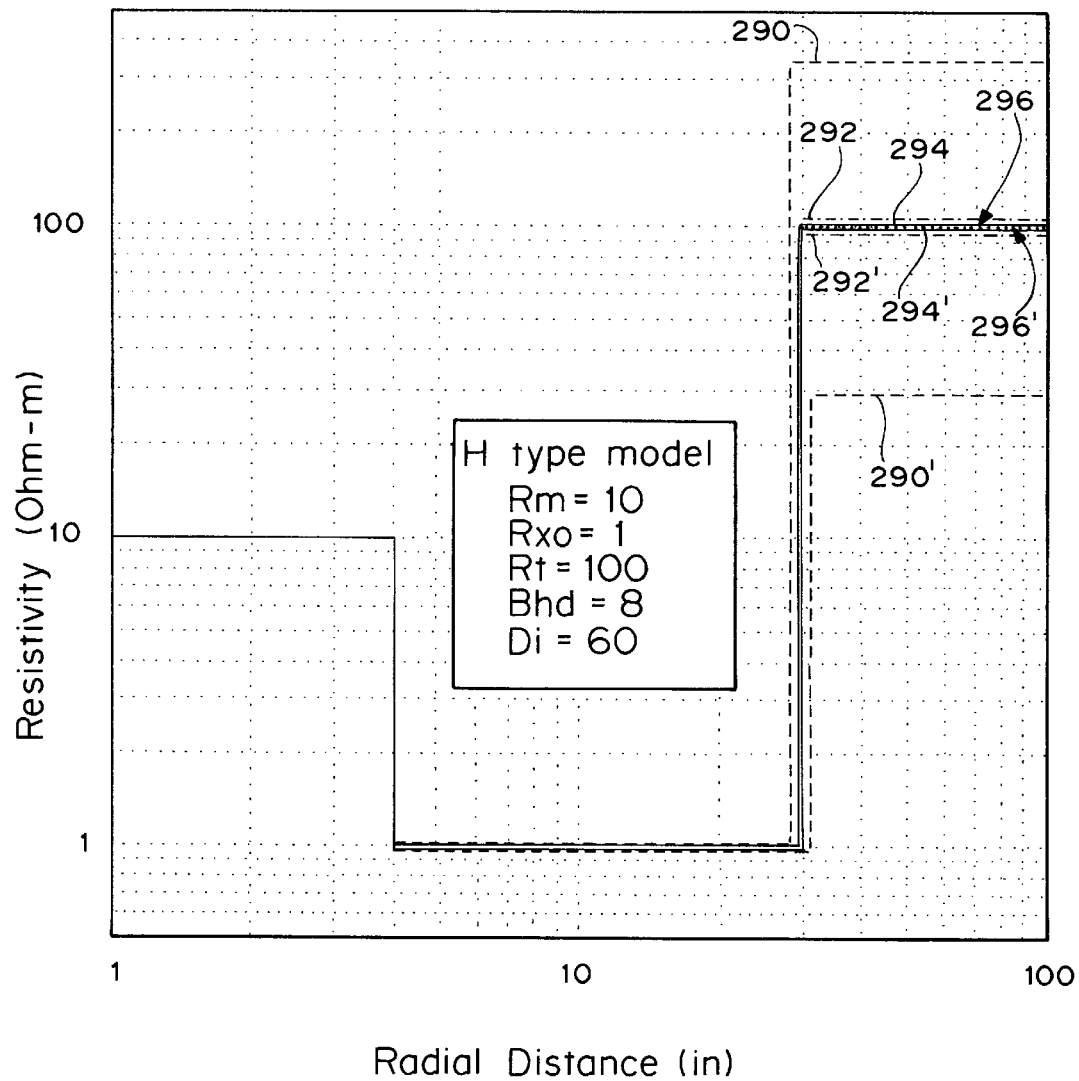
FIG. 26 is a diagram showing a plot of the formation resistivity vs. the radial distance or depth into the formation for reflecting the confidence level envelopes of the ellipsoids of confidence shown in FIG. 25 for the fourth selected earth model using the preselected combinations of the induction and lateral logging instruments.

As previously shown in FIGS. 20, 22 and 24, the information shown in the diagram of FIG. 25 can also be displayed in the form of a logarithmic model plot as shown in FIG. 26, where the true model is always towards the center of the suite of curves for each of the induction and/or lateral logging tool combinations. The combination for the DPIL+SFL is shown by the largest uncertainty envelope defined by the curves 290 and 290'. The uncertainty envelope for the combination of the DPIL+SFL+MLL+TBRT is shown by the curves 292 and 292'. The uncertainty envelope for the combination of the DLL+TBRT+MLL is shown by the curves 294 and 294', while the uncertainty envelope of the combination of all tools is shown by the curves 296 and 296', which again can be seen to virtually coincide with the curves 294 and 294'.

In practice, the combination of the two principles of physical measurement (inductive and galvanic) is accomplished by combining the independent data sets from each measurement and deriving a single model which gives responses in agreement with the data sets from each type of measurement. The determination of the agreement of the data sets with the derived model can be expressed, for example, as an RMS error or fit. The interpretative technique for deriving this model is well known as "inversion" or "least square inversion" or "system identification" in the data processing field. Also, neural network techniques or other artificial intelligence tools could be used to achieve the same result. The processing technique used in initially deriving the invention as above described uses the derivatives of the model function with respect to the modeled parameters to evaluate the sensitivities of the modelled solution to each of the parameters. This approach facilitates the determination of which parameters are sensitive due to the induction logging and lateral logging measurements, respectively.

Figure 27:
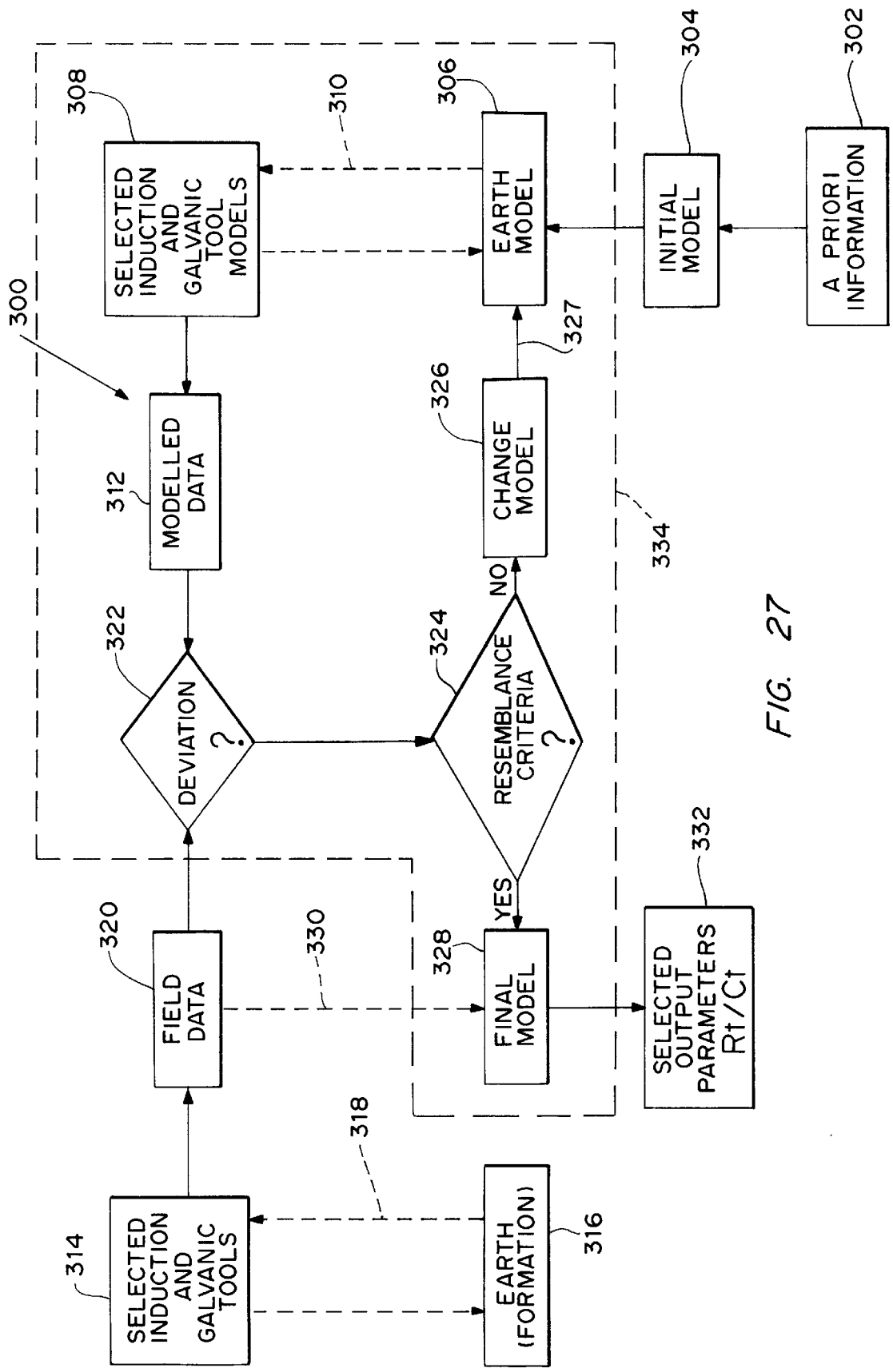
FIG. 27 is a functional block diagram schematic of the steps of an example inverse modelling technique used in combining field induction and galvanic logging data to determine a desired formation resistivity parameter in accordance with this invention.

In the field application of this technique, the "joint inversion" data processing technique, as hereinabove described, will be used and a functional block diagram of an example process 300 is shown in FIG. 27. As previously described, the known available ("a priori") geological, physical and environmental information is also supplied at functional step 302, which, combined with the selected induction and galvanic tool parameter data, is then used to construct an initial assumed formation model at functional step 304, similar to one of the example type of formations (A-, Q-, K- or H-type) or combinations thereof, as above described. This initial model, determined at step 304, becomes the earth model shown at step 306. The information to do this may be compiled from multiple and complex origins, or simply be an analysis of the data from one of the induction or galvanic devices providing the data set. Based on the models for the selected induction and galvanic tools as determined at step 308, the estimated parameters of the initial earth model as determined at the functional step 306 are then used to calculate the selected inductive and lateral logging instrument response functions, as hereinabove described and, as shown by the dotted lines 310 and to generate "synthetic" modelled data at step 312 for the initial earth model determined at step 306.

The selected inductive and galvanic logging instruments are used in the field as shown in step 314 to interact with the actual earth formation surrounding the borehole as shown at 316 to generate actual inductive and galvanic logging data, as hereinabove described and as shown by the dotted lines 318 to obtain actual field data at step 320. The field data obtained in functional step 320 and the synthetic modelled data obtained in functional step 312 are compared at step 322 and the deviation is applied at step 324 to compare the deviation with an established range of values of resemblance criteria between the field measurement response data and the calculated measurement modelled response data. During the first iteration, the comparison of the actual field data obtained by the selected inductive and electrical galvanic logging instruments at step 320 to the "synthetic" or "modelled" data generated by the initial earth model and the selected logging instrument responses as obtained at step 312 is likely to differ by an amount greater than an established range of values of a resemblance criteria between the field measurement response data and the calculated measurement data. Any deviation values or data that occurs at the comparison step 324 is used at the functional step 326 to provide adjustment data for the initial earth model formation parameters via feedback loop 327 to the earth formation model step 306 using standard data processing techniques.

The adjusted earth formation model 306 developed by the model change step 326 is again used to generate "synthetic" or "modelled" instrument response data based on the selected inductive and galvanic logging instruments as shown at 308. Such adjusted "synthetic" or "modelled" logging response data generated at step 312 is again compared with the actual combined field logging data obtained in step 320, using the same selected inductive and electrical galvanic logging instruments, as hereinabove described. If the numerical value of the resemblance criteria is too large at the comparison step 324 in this second comparison or iteration, the earth formation model is again adjusted at step 326, as hereinabove described, and the iterative process continues by the repetition of functional steps 312, 322, 324 and 326. When the comparison made at step 322 finally derives a deviation that falls within the predetermined criteria of resemblance at step 324, the adjusted formation model is considered to be optimized as shown at step 328. Based on the optimization of the adjusted model at step 328, the actual combined field data obtained at step 320 can now be applied as shown at 330 to the final model obtained in step 328 to generate the desired "optimized" output parameter, as shown at functional step 332. If the desired formation output parameter is a "resistivity" measurement of the formation strata of interest, then the output parameter of functional step 332 will typically include measure of $R_t$. However, if the desired formation output parameter is a "conductivity" measurement of the formation strata of interest, then the output parameter of functional step 332 will typically include a measure of $C_t$. The "inversion" modelling technique 334 previously referred to encompasses the functional steps included within the dashed lineblock and includes steps 306, 308, 310, 312, 322, 324, 326 and 328.

The examples described above demonstrate that the technique of combining the induction and galvanic effects of induction and lateral logging instruments is at least as good as and generally superior to and more accurate than relying on the interpretation of responses to any single tool. The method reduces the ambiguity in interpretation for a particular formation using any individual resistivity logging instrument. While it is possible that there may exist some instances where the formation model parameters might not permit this method to determine the optimum resistivity for the formation in question, the use of this optimization method when combined with other interpretative techniques as well as additional geological data will help to obtain better final results. In addition, when applying this technique to more complicated situations and models, certain combinations of the model parameters could be the final resolved output of the method as determined at step 328 rather than the independent output obtained at step 332.

It is common as part of the well logging art to measure the porosity of the formation, ø, and to calculate the water saturation ($S_w$) of the formation of interest using a variation of the well known Archie equation:

$$S_w = \frac{c\sqrt{R_w/R_t}}{\phi} \quad (14)$$

where: $S_w$=water saturation of the formation $R_w$=resistivity of the connate water of the formation $R_t$=resistivity of the formation of interest ø=formation porosity c=constant; (1.0 for carbonates & 0.90 for sands)

Once the water saturation, $S_w$, has been determined, the hydrocarbon saturation, $S_h$, of the formation can readily be calculated by $$S_h = (1-S_w) \quad (15)$$

The fraction of total formation volume that is hydrocarbons can be calculated as ø($S_h$) or ø(1-$S_w$).

As may readily be seen and appreciated, using the herein described method to more accurately measure formation parameters, especially the resistivity of the formation, $R_t$, using the combination of galvanic and induction methods, will provide more accurate determination of the formation hydrocarbon, saturation, $S_h$, and ultimately, the key calculation, the quantity of hydrocarbons present in the formation.

Numerous variations and modifications may be made in the structure and/or steps of the method and/or process herein described without departing from the present invention. Accordingly, it should be clearly understood that the forms of the invention herein described and shown in the figures of the accompanying drawings are illustrative only and are not intended to limit the scope of the invention. Practical application of the invention might include simplified processing to allow quick estimates of results to be made in real time or near real time.

We claims:

1. A method of determining selected parameters of an earth formation surrounding a borehole utilizing the measurements of selected induction and galvanic logging instruments, comprising the following steps:

(a) obtaining induction logging field measurements of the selected parameters in a first predetermined volume of the formation surrounding the borehole having known first radial and vertical dimensions, (b) obtaining galvanic logging field measurements of the identical selected parameters in a second predetermined volume of the formation surrounding the borehole having known second radial and vertical dimensions that overlap said first radial and vertical dimensions of said first predetermined volume, whereby said overlapping volumes form a representative common volume of the formation, (c) combining said inductive and electrical galvanic logging field measurements into a single combined logging field measurement for said representative common volume of the formation, (d) constructing an initial earth formation model based on known and estimated geological, physical and environmental information, (e) calculating anticipated induction and electric galvanic measurement responses for said initial earth formation model using the selected inductive and electrical galvanic logging instruments, (f) determining the deviation between said anticipated inductive and electric galvanic measurements for said constructed initial earth formation and the combined inductive and electrical galvanic field measurements, (g) establishing a range of values for the criteria of resemblance between said logging field measurements and said calculated logging measurements, (h) adjusting the initial earth formation model in response to any deviation determined between said anticipated inductive and electric galvanic measurements from said constructed formation model and said combined inductive and electrical galvanic field measurements that exceeds said established criteria of resemblance determined in step (g), (i) repeating steps (e), (f) and (h) until said deviation value between said calculated earth formation logging measurements and said combined logging field measurements is within said established criteria of resemblance as determined in step (g), and (j) in response to step (i) determining output values representative of the measured selected earth formation parameters representative of the combined induction and electric galvanic field measurements.

2. A method of determining selected parameters of an earth formation surrounding a borehole in accordance with the following steps:

(a) selecting inductive logging and electrical galvanic logging instruments for measuring responses of the earth formation surrounding the borehole, (b) acquiring field measurement response data for each of said selected inductive and electrical galvanic logging instruments for the earth formation surrounding the borehole, (c) combining the field measurement response data for each of said selected inductive and electrical galvanic logging instruments into a single field measurement response set of data, (d) determining an initial earth formation model based on known and estimated geological, physical and environmental information;

(e) calculating anticipated formation response data of the selected inductive and electrical galvanic logging instruments for said initial earth formation model;

(f) determining the deviation between said combined field measurement response data and said calculated anticipated formation response data, (g) establishing a range of values for the criteria of resemblance between said field measurement response data for the formation surrounding the borehole and said calculated anticipated measurement data for the initial earth formation model, (h) adjusting the initial earth formation model in response to said deviation between said calculated anticipated formation response data and said combined field measurement set of data exceeding said established criteria of resemblance determined in step (g);

(i) repeating steps (e), (f) and (h) until said deviation between said calculated earth formation response data and said actual combined field set of data is within said established criteria of resemblance as determined in step (g); and (j) in response to step (i) calculating an output value representative of the measuredment values of the selected earth formation parameters.

3. The method as described in claim 2, wherein the earth formation surrounding a borehole has a selected volume determined by the following steps (a) obtaining at least one induction logging measurement of the selected parameters in a first predetermined volume of the formation surrounding the borehole having known first radial and vertical dimensions, and (b) obtaining at least one galvanic logging measurement of the identical selected parameters in a second predetermined volume of the formation surrounding the borehole having known second radial and vertical dimensions that overlap said first radial and vertical dimensions of said first predetermined volume, whereby said overlapping volumes form a selected common volume of the formation.

4. The method as described in claim 2, wherein the earth formation surrounding a borehole has a selected volume determined by the following steps (a) obtaining at least one induction logging measurement of the selected parameters in a first predetermined volume of the formation surrounding the borehole, such first predetermined volume having known first radial and vertical dimensions, and (b) obtaining at least one galvanic logging measurement of the identical selected parameters in a second predetermined volume of the formation surrounding the borehole, such second predetermined volume having known second radial and vertical dimensions that differ from said first radial and vertical dimensions of said first predetermined volume, whereby said first and second predetermined volumes having said known first and second radial and vertical dimensions form a representative sample of the surrounding formation that includes multiple common volumes having common overlapping radial and vertical dimensions and which are radially or vertically spaced from each other.

5. The method of claims 1 or 2 wherein said value representative of the formation parameter using said combined induction and galvanic measurements of the parameter may be obtained with greater accuracy than may be derived from using either said induction or galvanic measurements alone.

6. The method of claims 1 or 2 wherein said value representative of the formation parameter using said combined induction and galvanic measurements of the parameter may be used to derive a more accurate calculation of hydrocarbon saturation in the earth formation than may be derived from using either said inductive or galvanic measurements alone.

7. The method of claims 1 or 2 wherein the selected parameter of the formation to be determined is resistivity.

8. A method of determining the resistivity of a preselected volume of an earth formation surrounding a borehole, comprising the following steps (a) selecting induction logging and electrical galvanic logging instruments for measuring responses related to resistivity of the earth formation surrounding the borehole, (b) acquiring field measurement responses related to resistivity for each of said selected inductive and electric galvanic logging instruments for the preselected volume of the earth formation, (c) combining the field measurement responses for said selected inductive and electrical galvanic logging instruments into a combined response representative of the resistivity of the preselected volume of the formation, (d) constructing an initial earth formation model based on known and estimated geological, physical and environmental information, (e) calculating anticipated formation responses of the selected inductive and electrical galvanic logging instruments for the resistivity of said initial earth formation model, (f) determining the deviation between said combined acquired field formation responses and said calculated anticipated formation responses, (g) establishing a range of values for the criteria of resemblance between said field measurement responses and said calculated anticipated measurement responses, (h) adjusting the initial earth formation model in response to said deviation determined between said calculated anticipated formation responses and said combined field measurement response that exceeds said established criteria of resemblance determined in step (g), (i) repeating steps (e), (f) and (h) until said deviation between said calculated anticipated earth formation response and said actual combined field measurement response is within said established criteria of resemblance as determined in step (g); and (j) in response to step (i) determining output values representative of the measurement of resistivity for the selected earth volume.

9. The method of determining resistivity as described in claim 8, wherein the earth formation surrounding a borehole has a selected volume determined by the following steps (a) obtaining at least one induction logging measurement of the selected parameters in a first predetermined volume of the formation surrounding the borehole having known first radial and vertical dimensions, and (b) obtaining at least one galvanic logging measurement of the identical selected parameters in a second predetermined volume of the formation surrounding the borehole having known second radial and vertical dimensions that overlap said first radial and vertical dimensions of said first predetermined volume, whereby said overlapping volumes form a selected common volume of the formation.

10. The method of determining resistivity as described in claim 8, wherein the earth formation surrounding a borehole has a selected volume determined by the following steps (a) obtaining at least one induction logging measurement of the selected parameters in a first predetermined volume of the formation surrounding the borehole, such first predetermined volume having known first radial and vertical dimensions, and (b) obtaining at least one galvanic logging measurement of the identical selected parameters in a second predetermined volume of the formation surrounding the borehole, such second predetermined volume having known second radial and vertical dimensions that differ from said first radial and vertical dimensions of said first predetermined volume, whereby said first and second predetermined volumes having said known first and second radial and vertical dimensions form a representative sample of the surrounding formation that includes multiple common volumes having common overlapping radial and vertical dimensions and which are radially or vertically spaced from each other.

* * * * *

UNITED STATES PATENT AND TRADEMARK OFFICE
CERTIFICATE OF CORRECTION

PATENT NO : 5,883,515
DATED : March 16, 1999
INVENTOR(S): Kurt M. Strack, Leonty A. Tabarovsky It is certified that error appears in the above-identified patent and that said Letters Patent is hereby corrected as shown below:

ON THE FACE OF THE PATENT,

Line [75] Inventors: Kurt M. Strack; Leonty A. Tabarovsky; Christopher C. Payton, all of Houston, Tex.

Signed and Sealed this

Eighteenth Day of January, 2000

Attest:

Q. TODD DICKINSON

*Attesting Officer*  *Commissioner of Patents and Trademarks*